United States Patent
Prakash et al.

(10) Patent No.: US 11,917,570 B2
(45) Date of Patent: *Feb. 27, 2024

(54) REFERENCE TIMING DELIVERY TO USER EQUIPMENT WITH PROPAGATION DELAY COMPENSATION

(71) Applicant: QUALCOMM Incorporated, San Diego, CA (US)

(72) Inventors: Rajat Prakash, San Diego, CA (US); Xiaoxia Zhang, San Diego, CA (US); Srinivas Yerramalli, San Diego, CA (US); Seyed Ali Akbar Fakoorian, San Diego, CA (US); Vinay Joseph, Calicut (IN)

(73) Assignee: QUALCOMM Incorporated, San Diego, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/452,049

(22) Filed: Oct. 22, 2021

(65) Prior Publication Data
US 2022/0046565 A1    Feb. 10, 2022

Related U.S. Application Data

(63) Continuation of application No. 16/836,543, filed on Mar. 31, 2020, now Pat. No. 11,184,872.
(Continued)

(51) Int. Cl.
*H04W 56/00* (2009.01)
(52) U.S. Cl.
CPC ....... *H04W 56/004* (2013.01); *H04W 56/001* (2013.01); *H04W 56/0065* (2013.01)
(58) Field of Classification Search
CPC ............. H04W 56/004; H04W 56/001; H04W 56/0065; H04W 56/0045; H04W 56/0015;
(Continued)

(56) References Cited

U.S. PATENT DOCUMENTS 9,698,962 B2   7/2017  Rajagopalan et al.
11,184,872 B2 * 11/2021 Prakash ............ H04W 56/0065
(Continued)

FOREIGN PATENT DOCUMENTS

WO    2015175291 A1   11/2015
WO    2016046611 A2    3/2016
WO    2018141179 A1    8/2018

OTHER PUBLICATIONS

Roth, John D., Murali Tummala, and James W. Scrofani. "Cellular synchronization assisted refinement (CeSAR): A method for accurate geolocation in LTE-A networks." 2016 49th Hawaii International Conference on System Sciences (HICSS). IEEE, 2016. (Year: 2016).*

(Continued)

*Primary Examiner* — Sharad Rampuria
(74) *Attorney, Agent, or Firm* — Arent Fox, LLP

(57) ABSTRACT

A wireless communication system is provided allowing a base station to indicate RTT compensation for UEs to adjust their local time clocks to correct propagation delay timing errors and synchronize with the global clock of a base station. A base station sends a downlink transmission including timing information to a UE and receives an uplink transmission from the UE after the downlink transmission. The base station determines a RTT compensation associated with the timing information based on a RTT between the downlink transmission and the uplink transmission. The base station then transmits the RTT compensation to the UE. UEs are thus allowed to synchronize at a high precision with the time clock of the base station. UEs may be configured with different resolutions or granularities in timing correction so that certain UEs can achieve high precision timing correction while other UEs can adjust their time clocks with less precision.

34 Claims, 14 Drawing Sheets

Related U.S. Application Data

(60) Provisional application No. 62/829,545, filed on Apr. 4, 2019.

(58) Field of Classification Search
CPC .......... H04W 56/0095; H04W 56/009; H04W 56/0085; H04W 56/008; H04W 56/007; H04W 56/006; H04W 56/0055; H04W 56/005; H04W 56/0035; H04W 56/003; H04W 56/0025; H04W 56/002; H04B 1/7073; H04B 1/7087; H04B 1/7156; H04B 1/7183; H04B 7/18589; H04B 7/19; H04B 7/2125; H04B 2201/7073; H04H 60/50; H04J 3/06; H04J 3/0602; H04J 3/0605; H04J 3/0614; H04J 3/0617
See application file for complete search history.

(56) References Cited

U.S. PATENT DOCUMENTS

| | | | |
|---|---|---|---|
| 2008/0267165 A1* | 10/2008 | Bertrand | H04J 3/06 455/574 |
| 2014/0370904 A1* | 12/2014 | Smith | H04W 76/11 455/450 |
| 2015/0373697 A1 | 12/2015 | Wang et al. | |
| 2019/0028985 A1* | 1/2019 | Wang | H04B 7/2687 |
| 2019/0150141 A1* | 5/2019 | Irukulapati | H04L 5/14 370/280 |
| 2019/0342800 A1* | 11/2019 | Sirotkin | H04B 17/318 |
| 2019/0342845 A1 | 11/2019 | Laselva et al. | |
| 2020/0084819 A1* | 3/2020 | Abedini | H04W 76/15 |
| 2020/0100130 A1* | 3/2020 | Bahnasy | H04W 92/12 |
| 2020/0259896 A1* | 8/2020 | Sachs | H04J 3/0667 |
| 2020/0322908 A1 | 10/2020 | Prakash et al. | |
| 2020/0367094 A1* | 11/2020 | Eriksson | H04W 40/02 |

OTHER PUBLICATIONS

Zeb, Shah, et al. "Impact of indoor multipath channels on timing advance for URLLC in industrial IoT." 2020 IEEE International Conference on Communications Workshops (ICC Workshops). IEEE, 2020 (Year: 2020).*

Godor, Istvan, et al. "A look inside 5G standards to support time synchronization for smart manufacturing." IEEE Communications Standards Magazine 4.3 (2020): 14-21. (Year: 2020).*

International Search Report and Written Opinion - PCT/US2020/026112 - ISA/EPO - 2020-10-06 (191688WO).

Iang G., et al., "Efficient Broadcast Retransmission based on Network Coding for Interplanetary Internet", China Communications, vol. 10, Issue 8, pp. 111-124, Aug. 2013.

Puttnies., H., "An Approach for Precise, Scalable, and Platform Independent Clock Synchronization", 2017 14th IEEE Annual Consumer Communications & Networking Conference (Ccnc), IEEE, 6 p. 2017 (Year: 2017).

* cited by examiner

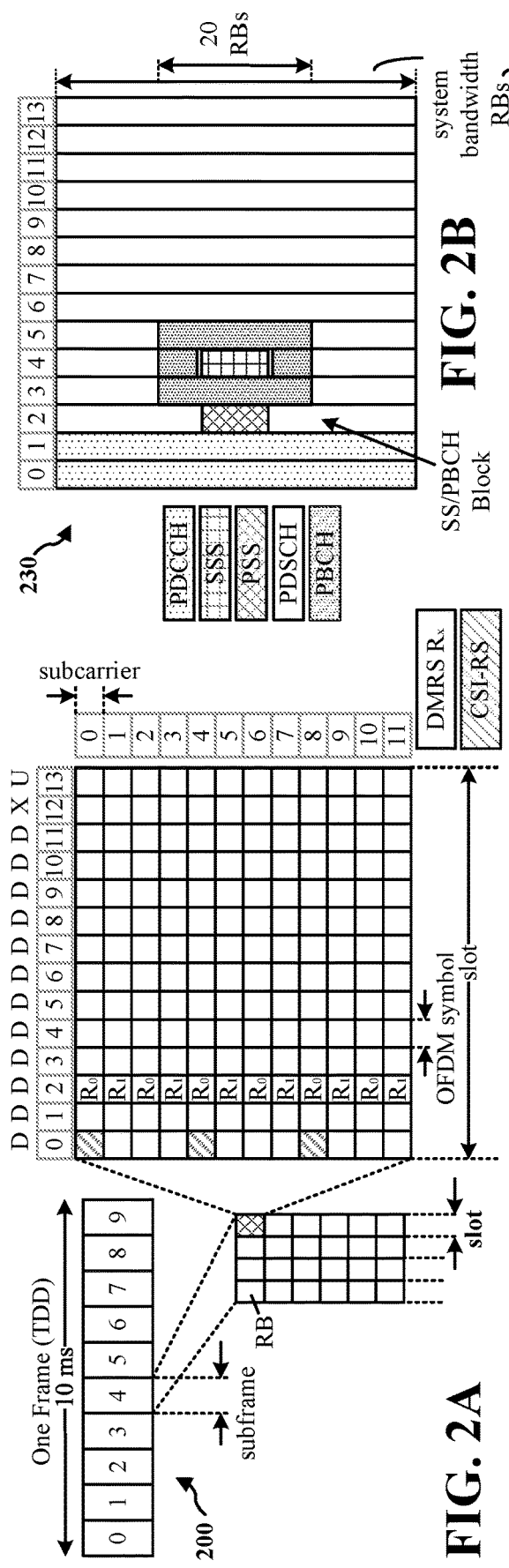
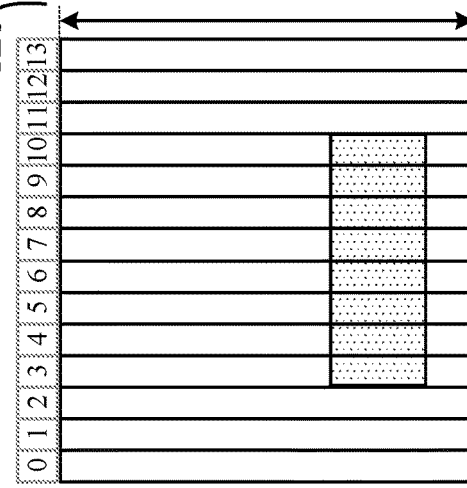
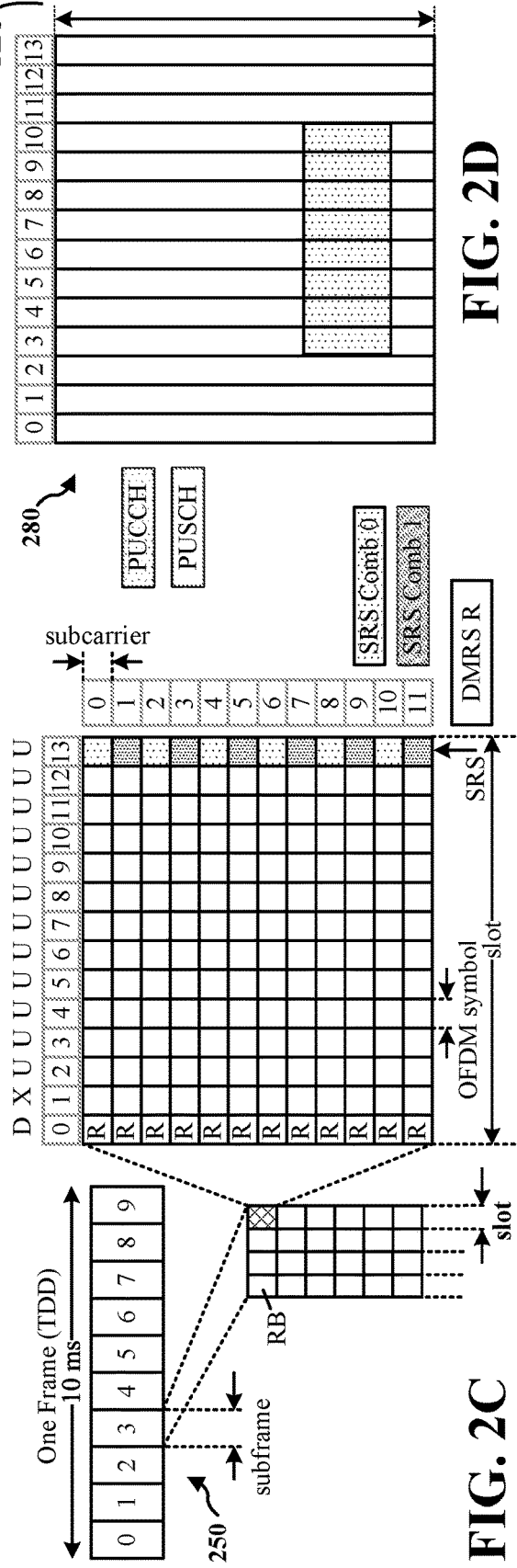

REFERENCE TIMING DELIVERY TO USER EQUIPMENT WITH PROPAGATION DELAY COMPENSATION

CROSS REFERENCE TO RELATED APPLICATION(S)

This application is a Continuation of U.S. application Ser. No. 16/836,543 entitled "REFERENCE TIMING DELIVERY TO USER EQUIPMENT WITH PROPAGATION DELAY COMPENSATION" and filed on Mar. 31, 2020, which claims the benefit of U.S. Provisional Application Ser. No. 62/829,545, entitled "REFERENCE TIMING DELIVERY TO USER EQUIPMENT WITH PROPAGATION DELAY COMPENSATION" and filed on Apr. 4, 2019, both of which are expressly incorporated by reference herein in their entirety.

BACKGROUND

Technical Field

The present disclosure relates generally to communication systems, and more particularly, to a wireless communication system between a base station and a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The Internet of Things (IoT) allows devices such as UEs to receive, process, and analyze data from a network of other interrelated computing devices in various consumer and industrial applications (e.g., telecommunications, automotive, energy, healthcare, etc.). In industrial IoT (IIoT) especially, where UEs may be located in and control processes of oil refineries, power plants, hospitals and the like, time synchronization between devices is very important. For example, multiple IIoT UEs may communicate with a base station to monitor patients' vitals, etc. If the downlink/uplink subframe timing is not accurately synchronized at the base station and the UEs, interference may arise and/or necessary data may be lost.

Therefore, to accurately synchronize timing between a base station and 5G-capable IIOT UEs, a base station may send timing information (e.g., a time-clock) to the UEs based on the IEEE1588v2/Precision Time Protocol. However, under this protocol, the working clock domains of UEs must be synchronized with the global clock of the base station (e.g., the synchronization master) within $\leq 1$ μs in service areas less than 20 $km^2$. This service area condition typically exists in outdoor, macro network deployments, where UEs may be hundreds of meters away from the base station and the propagation delay for transmissions may be large (e.g., 3 μs/km). As such large propagation delays can naturally offset the timing between the base station and UEs by more than 1 μs, round-trip time (RTT) compensation or propagation delay correction may be needed for the timing synchronization between base stations and UEs. Although global positioning system (GPS)-based timing synchronization may provide an alternative to the IEEE1588v2/Precision Time Protocol, 5G is advantageous since it provides a unified system for data communication and timing.

Hence, there is a need for a solution which allows base stations to deliver timing information to UEs in outdoor scenarios while taking into account RTT compensation to meet the $\leq 1$ μs synchronization accuracy parameter of IEEE1588v2/Precision Time Protocol. There is also a need to provide this solution for certain UEs (for example, IIOT UEs) while allowing other UEs (for example, non-IIOT UEs or legacy UEs) to continue to observe less precise timing synchronization parameters.

The present disclosure provides a solution to these needs by allowing a base station to indicate RTT compensation for UEs to use in adjusting their individual or local time clocks, thereby allowing UEs to synchronize at a high precision with the time clock of the base station. The present disclosure further allows UEs to be configured with different resolutions or granularities in timing correction so that certain UEs can achieve high precision timing correction while other UEs can adjust their time clocks with less precision. In this way, base stations may deliver timing information to UEs in outdoor scenarios while taking into account RTT compensation to meet the $\leq 1$ μs synchronization accuracy parameter of IEEE1588v2/Precision Time Protocol. Moreover, certain UEs (e.g., IIOT UEs) may obtain higher precision for timing correction while other UEs (e.g., non-IIOT UEs or legacy UEs) may observe less precise timing synchronization parameters.

In an aspect of the disclosure, a method, a computer-readable medium, and an apparatus are provided. The apparatus may be a base station. In various aspects, the base station sends a downlink transmission including timing information to a UE and receives an uplink transmission from the UE after the downlink transmission. The base station then determines a RTT compensation associated with the timing information based on a RTT between the downlink transmission and the uplink transmission. The base station then transmits the RTT compensation to the UE.

In another aspect of the disclosure, a method, a computer-readable medium, and an apparatus are provided. The apparatus may be a UE. In various aspects, a UE receives a downlink transmission including timing information from a base station. The UE sends an uplink transmission to the base station after the downlink transmission, and obtains a RTT compensation for the timing information based on a RTT between the downlink transmission and the uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
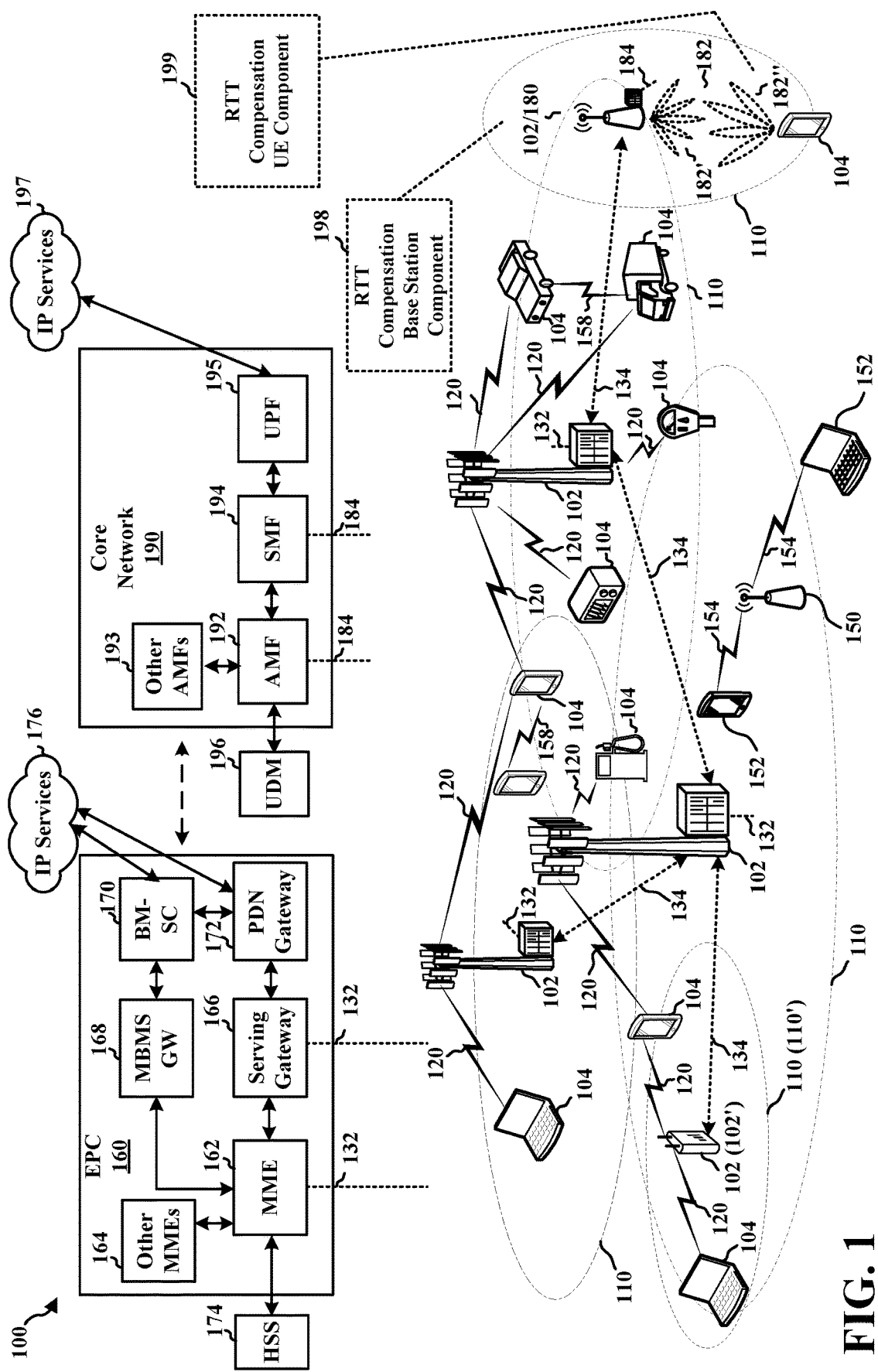
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as Internet-of-Things (IoT) devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may include a RTT compensation base station component 198 configured to send a downlink transmission including timing information to a UE 104. At the base station 102/180, the RTT compensation base station component 198 may be further configured to receive an uplink transmission from the UE 104 after the downlink transmission. In addition, the RTT compensation base station component 198 may be further configured to determine a round-trip time (RTT) compensation associated with the timing information based on a RTT between the downlink transmission and the uplink transmission. The RTT compensation base station component 198 may be further configured to transmit the RTT compensation to the UE 104.

In certain other aspects, the UE 104 may include a RTT compensation UE component 199 configured to receive the downlink transmission including timing information from the base station 102/180. At the UE 104, the RTT compensation UE component 199 may be further configured to send the uplink transmission to the base station 102/180 after the downlink transmission. Further, the RTT compensation UE component 199 may be configured to obtain a RTT compensation for the timing information based on a RTT between the downlink transmission and the uplink transmission.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgement (ACK)/negative ACK (HACK) feedback. The PUSCH carries data, and may additionally be used to carry a buffer status report (BSR), a power headroom report (PHR), and/or UCI.

Figure 3:
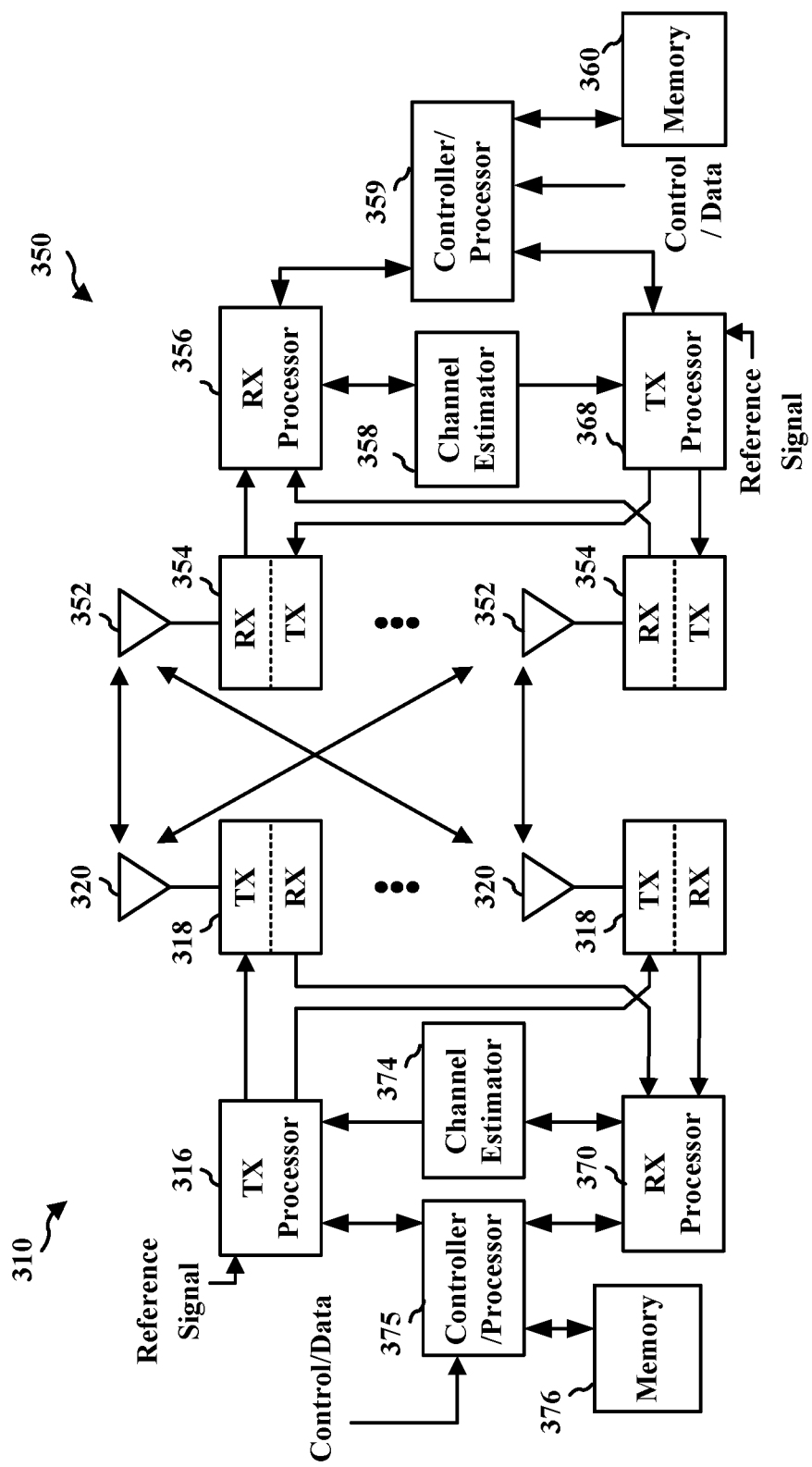
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal.

The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the RTT compensation UE component 199 of FIG. 1.

In some other aspects, at least one of the TX processor 316, the RX processor 370, and the controller/processor 375 may be configured to perform aspects in connection with the RTT compensation base station component 198 of FIG. 1.

IoT allows devices, such as UEs, to receive, process, and analyze data from a network of other interrelated computing devices in various consumer and industrial applications (e.g., telecommunications, automotive, energy, healthcare, etc.). In industrial IoT (IIoT) especially, where UEs may be located in and control processes of oil refineries, power plants, hospitals and the like, time synchronization between devices is very important. For example, multiple IIoT UEs may communicate with a base station to monitor patients' vitals, etc. If the downlink/uplink subframe timing is not accurately synchronized at the base station and the UEs, interference may arise and/or important data may be lost.

Therefore, to accurately synchronize timing between a base station and 5G-capable IIOT UEs, a base station may send timing information (e.g., a time-clock) to the UEs based on the IEEE1588v2/Precision Time Protocol. However, under this protocol, the working clock domains of UEs must be synchronized with the global clock of the base station (e.g., the synchronization master) within ≤1 µs in service areas less than 20 km$^2$. This service area parameter typically exists in outdoor, macro network deployments, where UEs may be hundreds of meters away from the base station and the propagation delay for transmissions may be large (e.g., 3 µs/km). As such large propagation delays can naturally offset the timing between the base station and UEs by more than 1 µs, RTT compensation or propagation delay correction may be needed for the timing synchronization between base stations and UEs. Although global positioning system (GPS)-based timing synchronization may provide an alternative to the IEEE1588v2/Precision Time Protocol, 5G NR is advantageous since 5G NR provides a unified system for data communication and timing.

Hence, a need exists for a solution which allows base stations to deliver timing information to UEs in outdoor scenarios while taking into account RTT compensation to meet the ≤1 μs synchronization accuracy parameter of IEEE1588v2/Precision Time Protocol. A need also exists to provide a similar solution to certain UEs (for example, IIOT UEs) while allowing other UEs (for example, non-IIOT UEs and/or legacy UEs) to continue to observe less precise timing synchronization parameters.

The present disclosure provides various approaches and solutions to the aforementioned needs by allowing a base station to indicate RTT compensations to UEs to use in adjusting individual or local time clocks, thereby allowing UEs to relatively precisely synchronize with the time clock of the base station. The present disclosure further provides for UEs to be configured with different resolutions or granularities in timing correction so that certain UEs can achieve highly precise timing corrections while other UEs can adjust their time clocks with less precision. In this way, base stations may deliver timing information to UEs in outdoor scenarios while taking into account RTT compensation to meet the ≤1 μs synchronization accuracy parameter of IEEE1588v2/Precision Time Protocol. Moreover, certain UEs (e.g., IIOT UEs) may obtain higher precision for timing correction while other UEs (e.g., non-IIOT UEs or legacy UEs) may observe less precise timing synchronization parameters.

Figure 4:
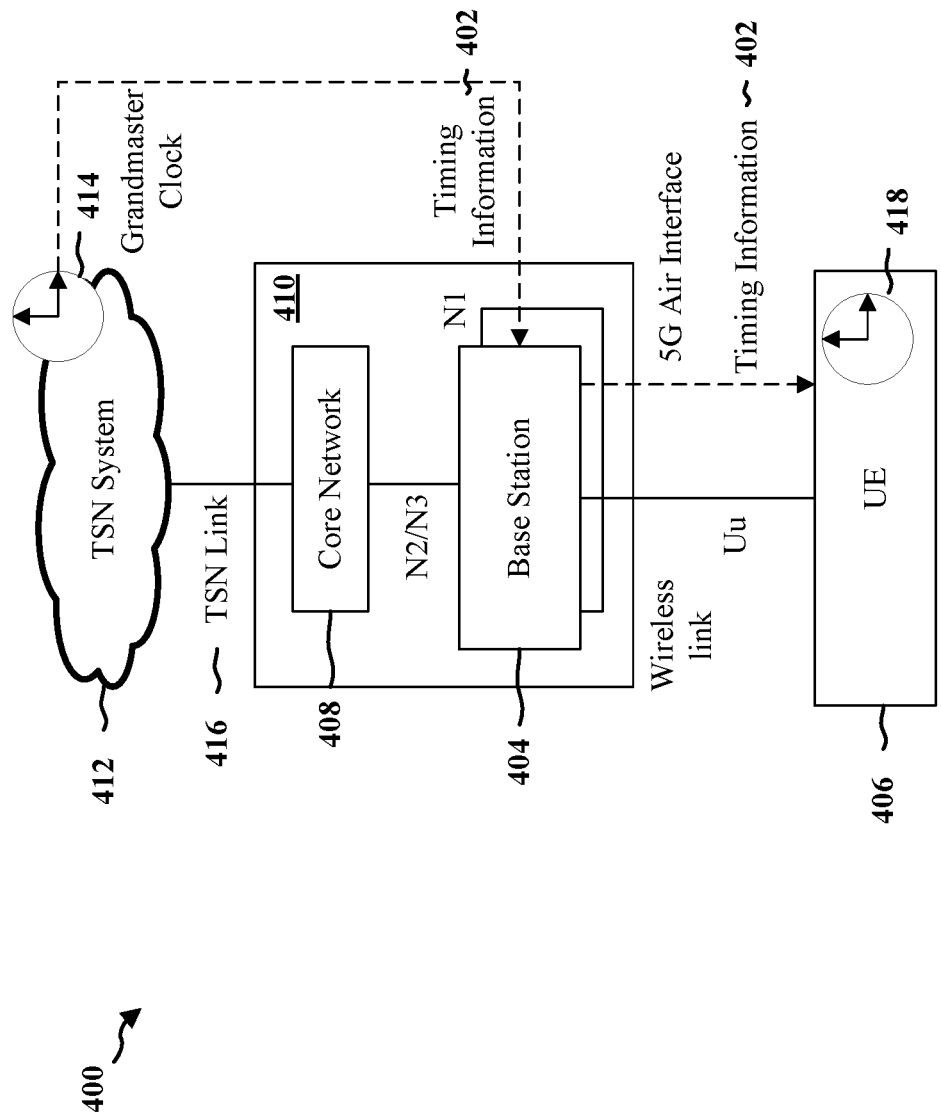
FIG. 4 is a diagram illustrating an example communication flow of timing information from one or more base stations to a UE.

FIG. 4 is a diagram 400 illustrating an example communication flow of timing information 402 from one or more base stations 404 (e.g., base station 180) to a UE 406 (e.g., base station 102). The base station 404 may communicate with a 5G core network 408 (e.g., core network 190) via a N2 interface (e.g., through AMF 192) and/or a N3 interface (e.g., through UPF 195). The base station 404 may also communicate with the UE 406 over a wireless link or Uu interface, while the 5G core network 408 may communicate directly with the UE 406 via a N1 interface. The base station 404 and 5G core network may be components of a 5G core architecture 410.

A time-sensitive network (TSN) system 412 may be connected to the 5G core network 408. The TSN 412 may include a grandmaster clock 414 serving as the global clock for the base station 404. The TSN system 412 may be connected to the 5G core architecture 410 via a TSN link 416. The UE 406 includes the local clock 418 of the UE 406.

To synchronize the timing of the base station 404 and the UE 406, the base station first receives the timing information 402 from the grandmaster clock 414 and then provides the timing information 402 to the UE over a 5G air interface. In this way, the UE 406 can synchronize the local clock 418 or working clock(s) with the global clock of the base station 404.

Figure 5:
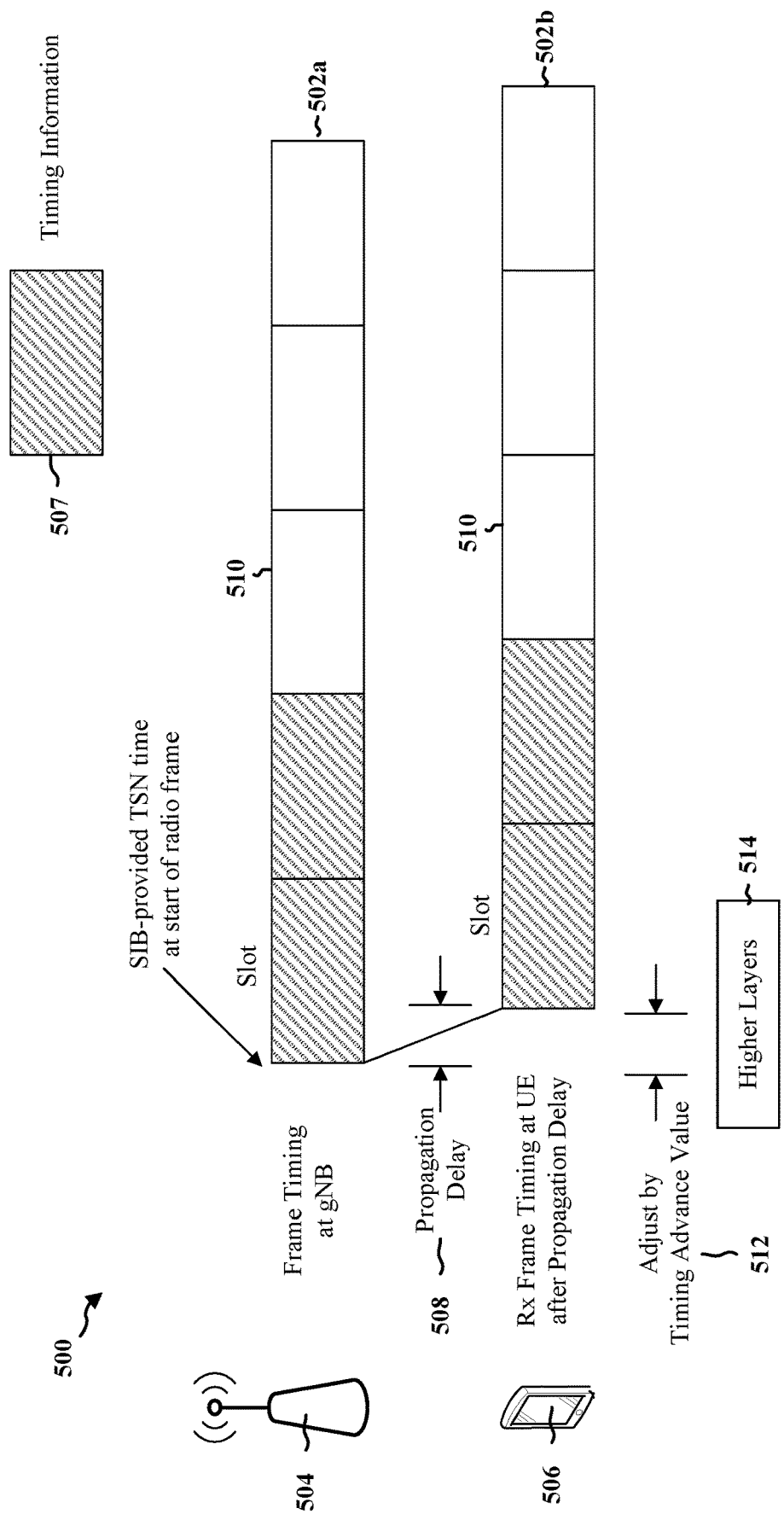
FIG. 5 is a diagram illustrating examples of transmission frames respectively transmitted by a base station and received by a UE.

FIG. 5 illustrates a diagram 500 illustrating examples of transmission frames 502a, 502b respectively transmitted by a base station 504 and received by a UE 506. When the base station 504 sends a transmission frame 502a including timing information 507 (e.g., timing information 402 received from TSN 412), the UE 506 may receive the corresponding transmission frame 502b including the timing information after a propagation delay 508. In certain aspects, the UE 506 may compensate for the propagation delay 508 based on whether the timing information 507 is broadcast or unicast to the UE 506.

In one aspect, timing information 507 received from the TSN (e.g., TSN 412) may be commonly broadcast to multiple UEs 506. In some aspects, the timing information 507 may include information associated with one or more symbols and/or one or more slots 510 at the beginning of frames 502a, 502b. For example, the timing information 507 may indicate a pointer to frame number, which is used by the UE 506 to derive the frame number which is the beginning of a downlink transmission. In some aspects, the beginning of the frame may refer to the first symbol of that frame, which may be the first symbol of that frame (e.g., first OFDM symbol). While the timing information 507 may be illustrated as occurring at the beginning of a frame, the timing information 507 may be carried in other locations (e.g., symbols) of a frame that are not necessarily at the beginning of the frame. The base station 504 may broadcast the timing information 507 in a SIB at a 40 nanosecond (ns) resolution. Each UE 506 receiving the broadcast message may subsequently adjust their local clock (e.g., local clock 418 in FIG. 4) based on a compensation for propagation delay 508 received from the base station 504.

In some other aspects, timing information 507 may be unicast to individual UEs 506 that need the timing information (for example, for individual applications). The timing information 507 may indicate information associated with the beginning of frames 502a, 502b. The unicast message may be typically sent via an RRC protocol (for example, in RACH). When unicast signaling is used, as each UE has their own local clock (e.g., local clock 418 in FIG. 4), potentially different timing information 507 with different compensations for propagation delay 508 may be individually sent to different UEs 506. In certain aspects, the UEs 506 may adjust their local clocks based on an estimate of propagation delay 508 which is known to base station 504.

In one example, referring to FIGS. 4 and 5 according to a first aspect of the present disclosure, the base station 404, 504 or network indicates the timing information 402, 507 (e.g., a common system timing) via unicast or broadcast signaling to UE 406, 506. The timing information 507 may indicate information associated with one or more symbols and/or slots at the beginning of a downlink transmission (e.g., frame 502a). The UE 406, 506 receives the downlink transmission (e.g., frame 502b) (e.g., based on the timing information 402, 507) from the base station 404, 504 after a propagation delay 508 from the transmitted frame 502a. The UE 406, 506 may subsequently send an uplink transmission. Based on a RTT between the downlink and uplink transmissions, the base station 404, 504 may send a RTT compensation to the UE 406, 506. The timing information 402, 507 may be transmitted with the RTT compensation. In one aspect, the RTT compensation may be a timing advance (TA) 512 within a TA command. For example, the base station 404, 504 may transmit, and the UE 406, 506 may receive, the RTT compensation within a TA command in a random access response (RAR) of a RACH procedure.

After receiving the TA command with the RTT compensation, the UE 406, 506 adjusts the local clock 418 with the timing advance 512 and delivers the adjusted time to the upper layers 514 of the UE 406, 506 (e.g., layer 2 and/or layer 3). For example, the UE 406, 506 may deliver an adjusted time to the upper layers 514 based on the following formula after receiving a broadcast timing information 402, 507:

Time Delivered to Upper Layer=Broadcasted Time+"Applied TA Advance"/2, where Broadcasted Time is the UE reception timing of the downlink transmission indicating the timing information 402, 507 after the propagation delay 508; and "Applied TA Advance" is the timing advance 512 indicated in the TA command.

Thus, in one aspect, a UE may generally use a timing advance framework to compensate for and/or correct a lack of timing synchronicity caused by the propagation delay between a base station and the UE. Certain aspects related to the timing advance are described below with respect to FIGS. 6, 7A, and 7B and accompanying description. In another aspect, a UE may use a separate procedure independent from a TA to correct timing synchronicity between a base station and the UE. Certain aspects related to this other aspect are described below with respect to FIG. 8 and accompanying description.

In various aspects, the base station may indicate an RTT compensation to the UE. The RTT compensation may include, for example, a TA within a TA command, a timing offset between a base station transmission timeline and a base station reception timeline, an estimated time difference between a base station transmission timing and a base station reception timing, and/or an actual time difference between a base station transmission timing and a base station reception timing and a UE transmission timing and a UE reception timing.

Figure 6:
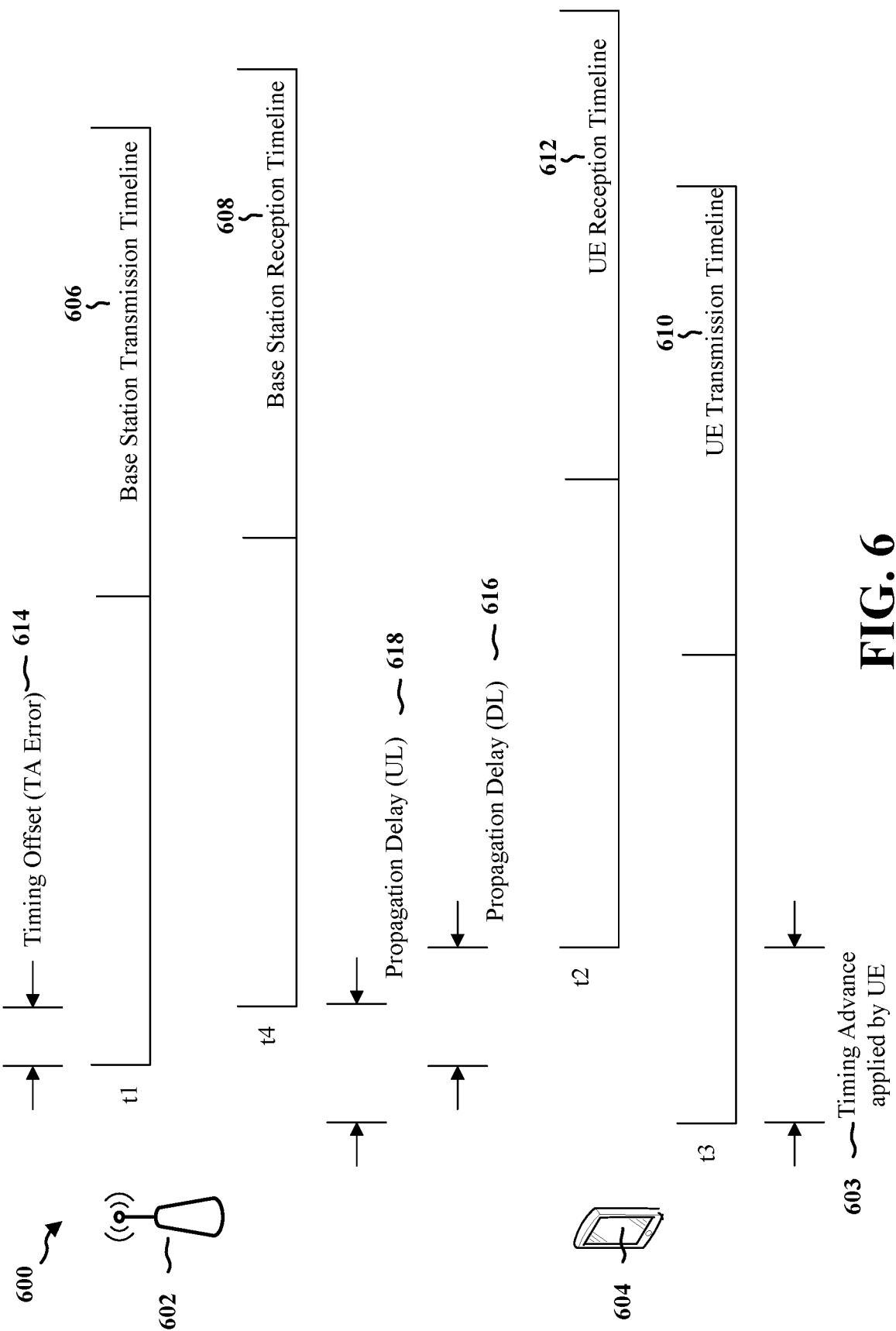
FIG. 6 is a diagram illustrating various timelines for downlink and uplink transmissions between a base station and UE.

FIG. 6 shows a diagram 600 illustrating various timelines for downlink and uplink transmissions between a base station 602 and UE 604. In particular, the base station 602 sends downlink transmissions according to a base station transmission timeline 606, while the base station receives uplink transmissions according to a base station reception timeline 608. Similarly, the UE 604 sends uplink transmissions according to a UE transmission timeline 610, while the UE receives downlink transmissions according to a UE reception timeline 612. In one aspect, in order to synchronize the timing information (e.g., timing information 402, 507) corresponding to the UE and base station timelines, the base station 602 may send an RTT compensation (e.g., one or more TAs in one or more TA commands) to the UE 604. Based on the RTT compensation received from the base station 602, the UE 604 may control the timing of the UE transmission and reception timelines 610, 612 relative to the base station transmission and reception timelines 606, 608.

Generally, the base station transmission timeline 606 and the base station reception timeline 608 are aligned. However, in certain aspects, the timelines 606, 608 may be offset. For example, FIG. 6 illustrates a timing offset 614 or TA error (e.g., referred to as a gNBRxOffset or some other name) between the base station transmission timeline 606 and base station reception timeline 608. The base station 602 may adjust the base station reception timeline 608 to be offset from the base station transmission timeline 606 (e.g., using separate processors) in cases where, for instance, the UE 604 needs extra time to decode a downlink transmission and provide ACK than the base station 602 may need to decode an uplink transmission and provide ACK. The base station 602 may also include timing offset 614 in frequency division duplex (FDD) systems where there may be no inherent parameter for the base station transmission timeline 606 and base station reception timeline 608 to be exactly aligned, and/or in time division duplex (TDD) systems where the base station may flexibly align the timelines 606, 608 with any timing offset 614 subject to both timelines being within a guard period in the bandwidth of a transmission channel.

In certain aspects, the base station transmission timeline 606 and the base station reception timeline 608 are aligned within a guard period when base station 602 and UE 604 communicate in a TDD mode. In other aspects, the uplink transmissions from multiple UEs 604 may be received by the base station 602 within the CP of a subsequent downlink transmission in either the TDD mode or a FDD mode. In additional aspects, the timing advance command may request an individual UE 604 to advance or delay a UE transmission timelines 610 to synchronize with the timing of the base station 602.

In one example referring to FIG. 6, a base station 602 sends a downlink transmission including timing information and RTT compensation at time t1 in the transmission timeline 606. The time t1 may be synchronized to the grandmaster clock (e.g., grandmaster clock 414) and may be indicated in the timing information (e.g., timing information 402, 507). The RTT compensation may be equal to the timing advance 603 included in a TA command. After a downlink propagation delay 616, the UE 604 subsequently receives the downlink transmission at time t2 in the reception timeline 612. As illustrated in FIG. 6 with respect to the downlink transmission, the UE reception timeline 612 is offset from the base station transmission timeline 606 by downlink propagation delay 616.

To compensate for this offset, the UE 604 applies the RTT compensation (e.g., the received timing advance 603) to the local clock such that the UE transmission timeline 610 is advanced with respect to the base station reception timeline 608. As shown in FIG. 6 at time t3, the UE transmission timeline 610 is advanced with respect to the base station reception timeline 608. The UE 604 then transmits the uplink transmission at time t3 in the transmission timeline 610. After an uplink propagation delay 618, the base station 602 subsequently receives the uplink transmission at time t4 in the reception timeline 608.

As a result, the local clock of the UE 604 may be synchronized with the global clock of the base station 602 using the RTT compensation. Although the base station reception timeline 608 may be aligned with the base station transmission timeline 606, the timelines 606, 608 may include a timing offset 614 in some other aspects, as illustrated in FIG. 6. Potentially, when the base station reception timeline 608 is aligned with the base station transmission timeline 606, the downlink propagation delay 616 is generally the same as the uplink propagation delay 618. As a result, the RTT compensation applied by the UE 604 may generally be twice the propagation delay 616 or the propagation delay 618.

Figures 7A, 7B:
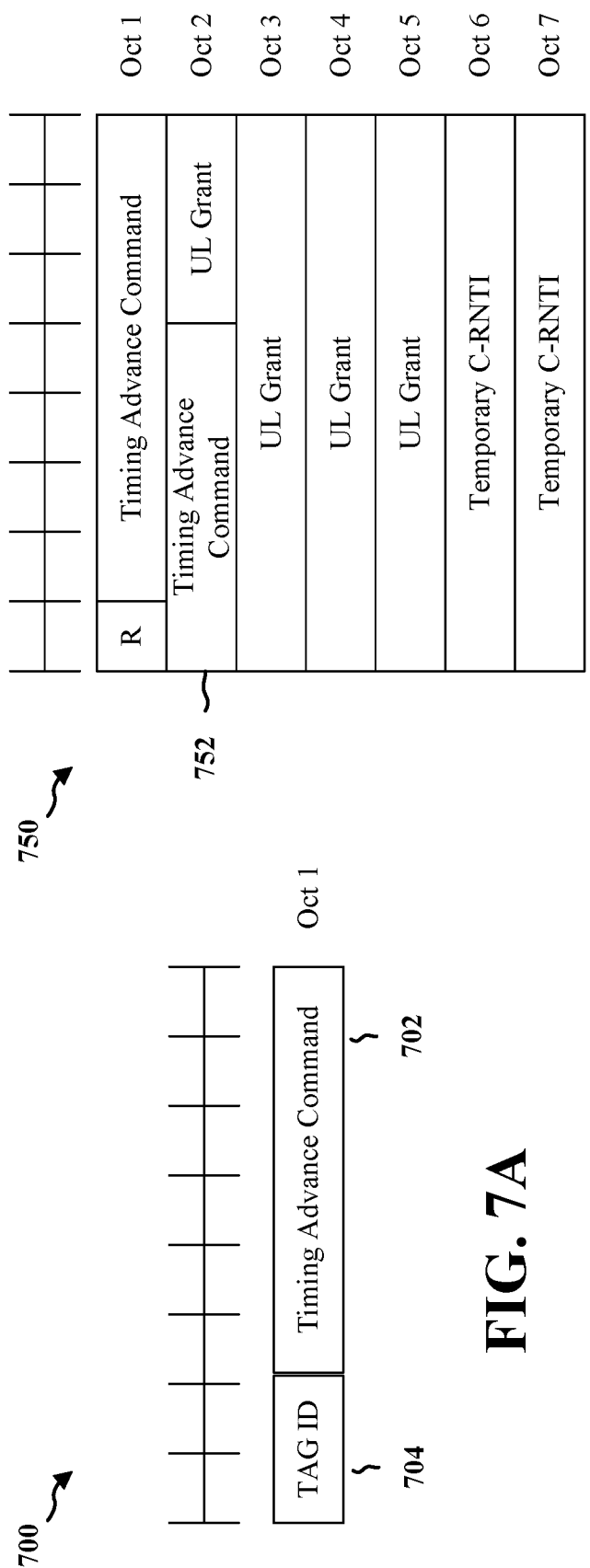
FIGS. 7A and 7B are diagrams illustrating different examples of frame structures in which a base station can provide a UE timing advance commands.

FIGS. 7A and 7B illustrate different examples of frame structures in which a base station can provide a UE TA commands. For example, FIG. 7A illustrates an example of a MAC-Control Element (CE) (MAC-CE 700) including a 6-bit TA command 702 (e.g., maximum 6-bit TA command) and a timing advance group ID (TAG-ID) 704. Further, FIG. 7B illustrates an example of an RAR 750 including a 12-bit TA command 752 (e.g., maximum 12-bit TA command). The number of bits (e.g., (e.g., maximum number of bits) shown for the timing advance commands in FIGS. 7A and 7B are illustrative, and other numbers besides 6 or 12 bits for the TA commands may be used.

The base station (e.g., base station 602) may deliver a different value for the RTT compensation to the UE (e.g., UE 604) based on the frame structure used for the TA. In one example, if the UE is in connected mode and actively receiving communication from the base station, the base station may transmit and the UE may receive the MAC-CE 700 indicating the 6-bit TA command 702. In another example, if the UE is initially connecting to the base station (e.g., via RACH) or waking from a power save mode, the base station may transmit and the UE may receive the RAR 750 indicating the 12-bit TA command. The TA command 702 for MAC-CE 700 may have an index value between −31 and +31, while the TA command 752 for RAR 750 may have an index value between −2048 and +2048.

The TA applied by the UE is based on a TA index value (e.g., a value of the 6-bit or 12-bit TA command illustrated in FIG. 7A or 7B) and a TA granularity. The TA granularity indicates a time ($T_s$) by which the TA index value is multiplied in order to obtain the TA (e.g., TA 603 in FIG. 6). For example, assuming a 15 kHz subcarrier spacing (SCS), the TA granularity may be $16*64\ T_s$, where $T_s=1/(64*30.72)$ µs (in total, approximately 0.52 µs). Since the TA command 702 of MAC-CE 700 has a maximum index value of +31, the TA delivered in MAC-CE 700 may have a maximum value of 31*0.52 µs, or approximately 16 µs, and a minimum absolute non-zero value of 1*0.52 µs, or approximately 0.52 µs or 520 ns. Thus, referring to FIG. 6 in one example, when the UE 604 receives the downlink transmission including the timing information and a TA 603 at time t2, assuming a TA granularity associated with a 15 kHz SCS and a TA index value of 2, the UE 604 may advance the UE transmission timeline 610 by approximately 1 µs or 1000 ns with respect to the global clock of the base station 602.

The TA granularity may be a function of the SCS used in communication between the base station and the UE. As 5G includes multiple SCS, different TA granularities may be applied to obtain the TA depending on the SCS. Table 1 illustrates an example of various TA granularities for different SCS in 5G:

TABLE 1

| Subcarrier Spacing (kHz) of First Uplink Transmission After RAR | Timing Advance Granularity |
| --- | --- |
| 15 | $16*64\ T_s$ |
| 30 | $8*64\ T_s$ |
| 60 | $4*64\ T_s$ |
| 120 | $2*64\ T_s$ |

Thus, referring again to the example above concerning FIG. 6, if the SCS was changed from 15 kHz to 30 kHz with the TA index value of 2, the UE 604 may advance the UE transmission timeline 610 by approximately 0.5 µs with respect to the global clock of the base station 602. In some other aspects, if the SCS was changed to 120 kHz, the UE 604 may advance the UE transmission timeline 610 by approximately 0.125 µs.

Thus, UEs may adjust their local clocks to synchronize with the global clock of the base station using TA as an RTT compensation for the propagation delay between the base station and the UE. However, certain UEs (e.g., IIOT UEs) may need a higher timing synchronization accuracy to meet the ≤1 µs parameter of IEEE1588v2/Precision Time Protocol than the aforementioned TA granularity provides. Moreover, other UEs (e.g., legacy UEs) may not need to receive timing information with high precision synchronization parameters from the base station. Therefore, in one aspect of the present disclosure, finer, UE-specific TA granularity may be provided to increase synchronization accuracy for IIOT UEs, while the aforementioned granularity and TA procedure for legacy UEs may be maintained.

In various aspects, the base station (e.g., base station 602) or network may configure a UE-specific TA granularity. Thus, different TA granularities may be configured for different UEs. For example, an IIOT UE may be configured with a finer (e.g., smaller) TA granularity associated with a SCS than that of a legacy UE. Moreover, the UE-specific TA granularity may be different than any of the TA granularities indicated in Table 1 above.

In various aspects, the UE (e.g., UE 604) may report a UE identity as either an IIOT UE or a legacy UE to the base station (e.g., base station 602) or another network node (for example, during a SRS, RACH, or other uplink transmission). Depending on the reported identity of the UE, the base station may configure or indicate UE-specific TA granularities. For example, if the base station receives a message from the UE including an identification as a legacy UE, the base station may configure the UE with a TA granularity in accordance with Table 1. In another example, if the base station receives a message from the UE including an identification as an IIOT UE, the base station may indicate to the UE a UE-specific TA granularity which is finer than those indicated above in Table 1. In other examples, the base station may indicate identical or larger TA granularities to IIOT UEs compared to legacy UEs.

In one aspect, the UE-specific TA granularity may be configured separately from the TA command. For example, different TA granularities may be provided without changing the maximum size or header of the TA command 702, 752 in MAC-CE 700 or RAR 750. Rather, the network may configure another set of TA granularities different from those in Table 1 for UEs to apply to identical TA commands. For example, IIOT UEs may be configured with a different TA granularity than legacy UEs (e.g., $64\ T_s$ or other granularity smaller than those in Table 1) depending on the SCS for communication between the base station and UE. In another example, legacy UEs may request the base station or network to configure the UEs with a UE-specific TA granularity which may be different than other UEs. In this way, a base station may send the same TA command to IIOT UEs and legacy UEs, while allowing for UEs configured with different TA granularities to use different TAs for adjusting their local clock (e.g., finer or smaller TAs—e.g., approximately 15 or 30 ns as opposed to 1 µs for IIOT UEs).

In accordance with this aspect, a base station may determine to send multiple TA commands often to UEs configured with UE-specific TA granularities. For example, the base station may send multiple TA commands to achieve a certain TA precision for an IIOT UE or other UE configured with a UE-specific TA granularity. This situation may arise, for example, when an IIOT UE configured with a smaller TA granularity than that of Table 1 has moved farther away from the base station or experiences radio frequency interference, increasing the propagation delay, and therefore, incurring multiple TA commands to compensate for the delay. However, this situation may result in a "slamming" effect where the base station may need to "slam" an IIOT UE with multiple TA commands to achieve the same result that a single TA command could accomplish for a legacy UE (e.g., a 1 µs TA). Nevertheless, by fixing the maximum size or header of the TA command 702, 752 in MAC-CE 700 or RAR 750, this aspect limits the slamming effect based on the maximum index value available for the TA command.

In another aspect, the base station may dynamically indicate UE-specific TA granularities in downlink transmissions. The UE-specific TA granularities may be implemented by different TA commands used in connection with sending timing information to the UE. For example, the base station or network may configure MAC-CE 700 to have a new header or a larger size TA command which is transmitted to IIOT UEs separately from other TA commands. The increase in size may allow a base station transmitting the MAC-CE to convey to certain UEs higher resolutions (e.g., more precision) of TAs via a larger span of TA index values. In some other aspects, the size of the TA command may not be increased, and the base station may transmit MAC-CEs with different header values to convey to UEs higher resolutions of TAs via different TA granularities.

For example, one or more bits in the TA Command 702 of MAC-CE 700 may be used to designate the TA as being based on a first set of TA granularities (e.g., as shown for example in Table 1) or based on a second set of finer TA granularities. In another example, one of the values of the TAG ID 704 of MAC-CE 700 may be used to designate the first or second set of TA granularities. In a further example, a new MAC-CE with different size or header values than MAC-CE 700 may be provided to UEs receiving TAs based on the second set of TA granularities. Thus, the aforementioned "slamming" effect may be limited through use of separate TA commands for UEs with UE-specific TA granularities, due to the base station not needing to repeatedly send common TA commands to these UEs.

In another aspect, referring to FIG. 6, the TA 603 received and applied by the UE (e.g., an IIOT UE) may be based on the timing offset 614 between the base station transmission timeline 606 and base station reception timeline 608. Thus, referring to FIGS. 4 and 5, after receiving the TA command with the RTT compensation (e.g., TA 512), the UE 406, 506 may adjust the local clock 418 with the TA 512 based as well on the timing offset 614. In this case, the UE 406, 506 may deliver an adjusted time to the upper layers 514 based on the following formula after receiving a broadcast timing information 402, 507:

Time Delivered to Upper Layer=Broadcasted Time+ "Applied TA Advance"/2−gNBR×Offset, where:

Broadcasted Time is the UE reception timing of the downlink transmission indicating the timing information 402, 507 after propagation delay 508;

Applied TA Advance is the TA 512 indicated in the TA command; and gNBR×Offset is the timing offset 614 between the base station transmission timeline 606 and base station reception timeline 608.

In various aspects, the base station may indicate the timing offset 614 to the UE via a separate message from the timing information, rather than applying the timing offset 614 to the broadcasted timing information advertised by the base station. This separate message transmitted by the base station may be, for example, a physical layer (PLY) message, a layer 2 MAC message, or a layer 3 RRC message. Thus, when a base station transmits timing information to UE 604 corresponding to the value t1 in the base station transmission timeline, the base station may allow the UE to calculate the correct timing information using the TA by indicating the timing offset 614. In this way, legacy UEs or other UEs will not necessarily need to receive broadcast timing information with applied RTT compensation if they do not need high precision time synchronization.

Figure 8:
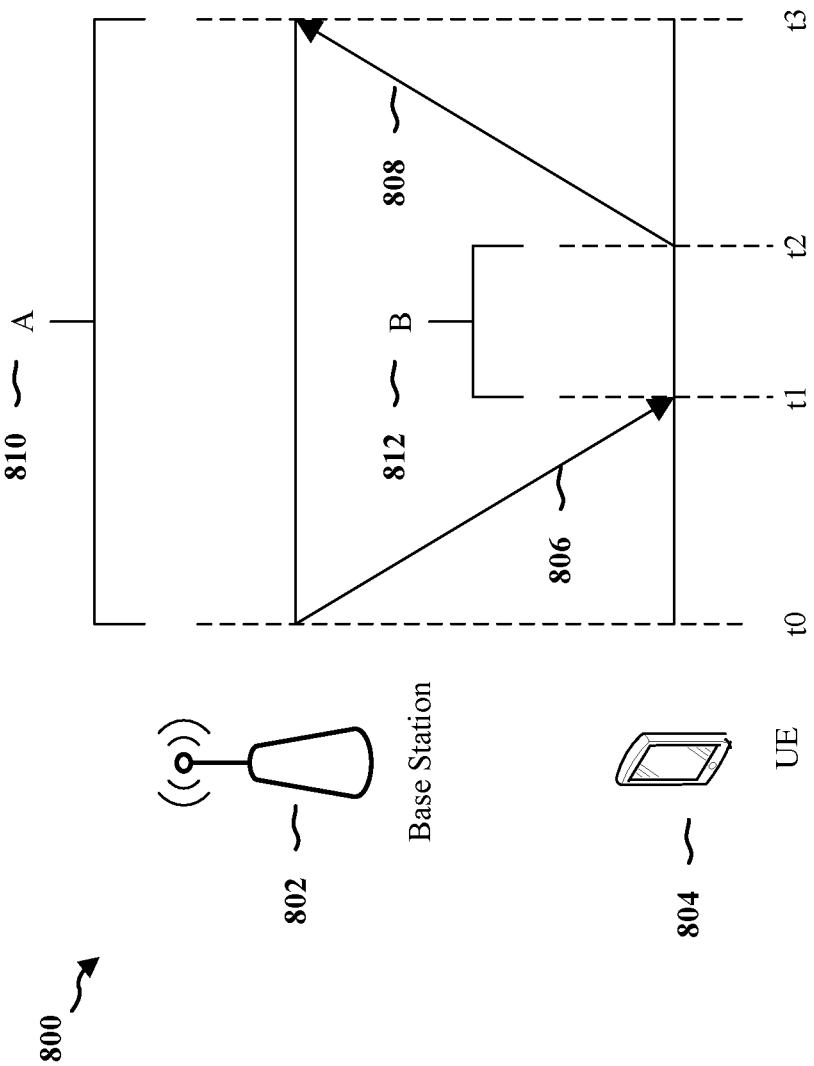
FIG. 8 is a diagram illustrating an example communication flow between a base station and a UE.

Referring now to FIG. 8, in a second aspect of the present disclosure, the base station or network indicates the timing information (e.g., an absolute time) including the RTT compensation to the UE via a separate and independent procedure from the TA command. FIG. 8 shows a diagram 800 illustrating an example communication flow between a base station 802 and a UE 804 in accordance with this second aspect of the present disclosure. In one aspect, the RTT compensation is UE-specific, and the timing information may be delivered to the UE via unicast signaling.

The base station 802 first sends a downlink transmission 806 at time t0, corresponding to the start of a frame boundary from the perspective of the base station. The downlink transmission 806 may include timing information corresponding to the absolute time provided by the grandmaster clock (e.g., timing information 507 in FIG. 5). The UE 804 subsequently receives the downlink transmission 806 at time t1, corresponding to the start of a frame boundary from the perspective of the UE. The UE then transmits an uplink transmission 808 at time t2. The uplink transmission 808 may be, for example, a SRS waveform (e.g., when the UE 804 is in connected mode) or a RACH waveform (e.g., when the UE 804 is in idle mode). The base station 802 subsequently receives the uplink transmission 808 at time t3.

In one aspect, the base station 802 may explicitly communicate the RTT between the fixed time, t0, and time the base station received the uplink transmission, t3, independently from TA commands. For example, in FIG. 8, the value A represents the base station time difference 810 between t3 and t0, while the value B represents the UE time difference 812 between t2 and t1. The UE may determine the RTT, and thus the propagation delay, based on the values of A and B. In one aspect, the base station estimates the value A by calculating the difference between t3 and t0, and sends the value A to the UE in a message. For example, the base station may send the value A in the downlink transmission 806. As the value B is known the UE, the UE may calculate the RTT by subtracting the value B from the received value A from the base station. The UE may then divide the RTT by two to obtain the one-way propagation delay, which the UE may use to adjust the timing information received from the base station to synchronize the local clock with the global clock.

In this way, the base station 802 or network may indicate, in a separate message from the TA command, the value A as the RTT compensation for UE 804 to use for timing synchronization. The message including the value A may be, for example, a PLY message, a layer 2 MAC message or a layer 3 RRC message transmitted by the base station to the UE. In contrast to TA command 702 or 752 (see FIG. 7), which may be limited in size to a small number of bits, the message including the value A may not be so limited, and could therefore range in the tens of nanoseconds, for example. Thus, the value A has higher granularity or precision for timing adjustment than the TA command, which may be constrained in size to the larger, microsecond range as described above. Moreover, the message including the value A can be sent less often than the TA command, avoiding slamming effect concerns.

Moreover, once the UE obtains the timing information with the RTT compensation (e.g., the value A), the UE may determine to adjust the timing information based on the propagation delay derived from the RTT compensation and the value B as described above. Thus, this aspect of the present disclosure allows a different framework than TA to be used to communicate the RTT compensation to the UE.

In another aspect, the UE 804 may indicate the value B to the base station 802, and the base station may determine the RTT compensation for the UE to use in timing synchronization. For example, after the UE receives at time t1 the downlink transmission 806, the UE 804 may transmit at time t2 to the base station 802 the value B in uplink transmission 808. Once the base station receives the value B, the base station may obtain the RTT and thus the propagation delay by calculating the actual value A and subtracting the UE-indicated value B.

The base station 802 or network may then provide the RTT compensation (e.g., the difference between the values of A and B) to the UE 804 based on whether the downlink transmission 806 including the timing information (e.g., the grandmaster clock time) was broadcast or unicast to the UE 804. In one aspect, if the downlink transmission 806 was broadcast to UE 804, the base station 802 may provide the RTT compensation to the UE 804 for the UE 804 to adjust the UE local clock to synchronize the timing information. For example, the RTT compensation may be broadcast to a plurality of UEs. In another aspect, if the downlink transmission 806 is unicast to UE 804, the base station 802 may either provide the RTT compensation to the UE 804 (e.g., as discussed above), or adjust the timing information with the RTT compensation and send the adjusted timing information to the UE 804.

Figure 9:
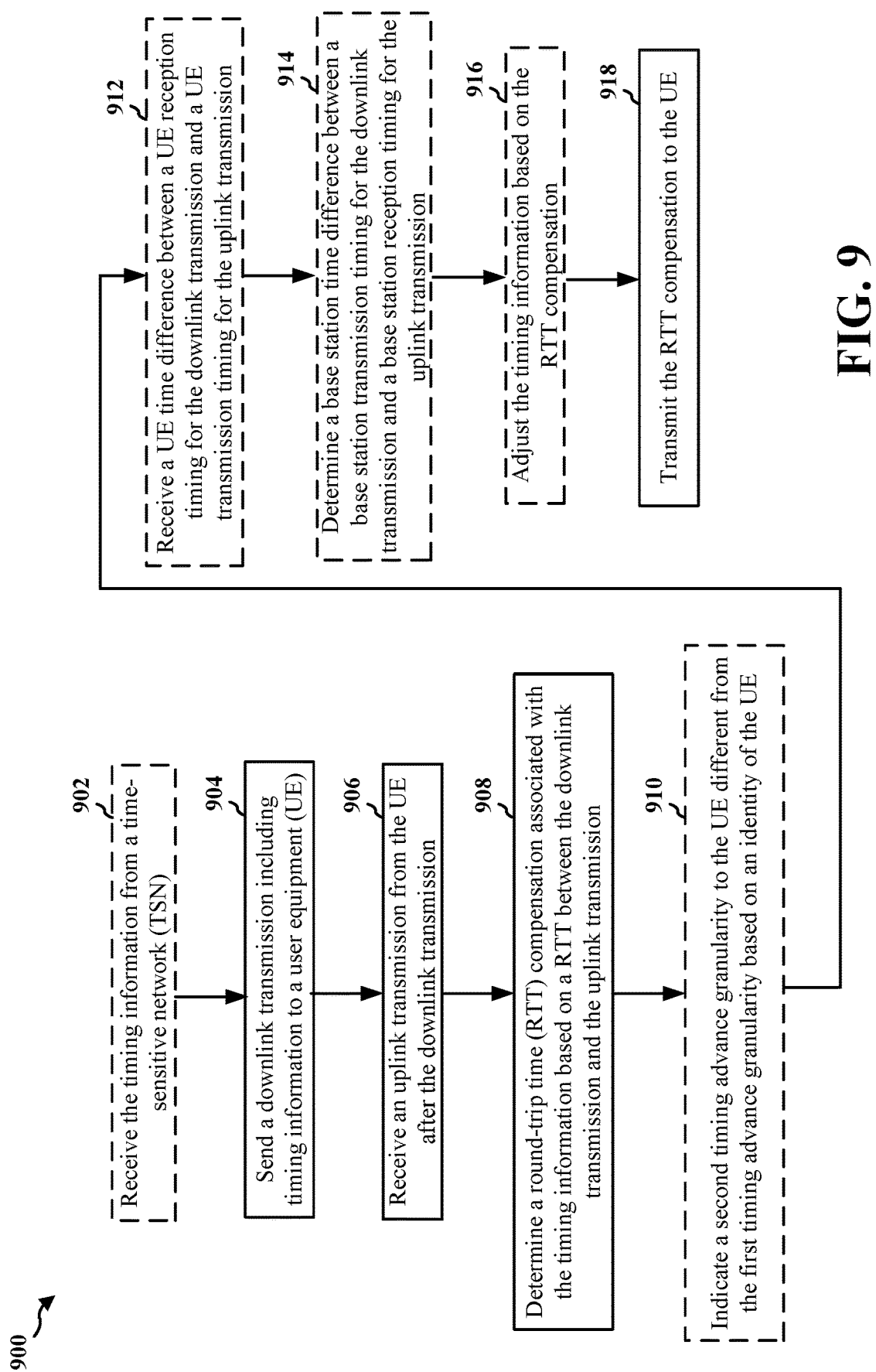
FIG. 9 is a flowchart of a method of wireless communication at a base station.

FIG. 9 is a flowchart 900 of a method of wireless communication. The method may be performed by a base station (e.g., the base station 102, 310, 404, 504, 602, 802; the apparatus 1002/1002'; the processing system 1114, which may include the memory 376 and which may be the entire base station 102, 310, 404, 504, 602, 802 or a component of the base station 102, 310, 404, 504, 602, 802, such as the TX processor 316, the RX processor 370, and/or the controller/processor 375). Optional aspects are illustrated in dashed lines. The method allows a base station to indicate RTT compensation for UEs to use in adjusting their individual or local time clocks, thereby allowing UEs to synchronize at a high precision with the time clock of the base station. The present disclosure further allows UEs to be configured with different resolutions or granularities in timing correction so that certain UEs can achieve high precision timing correction while other UEs can adjust their time clocks with less precision.

At 902, the base station receives the timing information from a TSN. For example, 902 may be performed by the reception component 1004 of FIG. 10. For example, referring to FIG. 4, to synchronize the timing of the base station 404 and the UE 406, the base station 404 receives the timing information 402 from the grandmaster clock 414 and then provides the timing information 402 to the UE 406 (e.g., over a 5G air interface). The TSN 412 may include the grandmaster clock 414, which serves as the global clock for the base station 404.

At 904, the base station sends a downlink transmission including timing information to a UE. For example, 904 may be performed by timing information component 1006 and/or transmission component 1008 of FIG. 10. The timing information may indicate information associated with a symbol and/or slot at a beginning of a frame of the downlink transmission. For example, referring to FIGS. 4 and 5, the base station 404, 504 or network indicates the timing information 402, 507 (e.g., a common system timing) via unicast or broadcast signaling to UE 406, 506. The timing information 402, 507 may indicate information associated with one or more symbols and/or slots at the beginning of a downlink transmission (e.g., frame 502a). Referring to FIG. 8, the base station 802 may send a downlink transmission 806 to the UE 804 at time t0, which may correspond to the start of a frame boundary from the perspective of the base station 802. The downlink transmission 806 may include timing information corresponding to the absolute time provided by the grandmaster clock (e.g., timing information 507 in FIG. 5).

In one aspect of 904, the downlink transmission including the timing information is broadcast to a plurality of UEs. In another aspect of 904, the downlink transmission including the timing information is unicast to the UE. For example, referring to FIG. 5, timing information 507 received from the TSN (e.g., TSN 412) may be commonly broadcast to multiple UEs, including the UE 506, and may include information associated with one or more symbols and/or one or more slots 510 at the beginning of frames 502a, 502b. For example, the base station 504 may broadcast the timing information 507 in a SIB at a 40 ns resolution. In some other aspects, timing information 507 may be unicast to individual UEs 506 that need the timing information (for example, for individual applications), and may indicate information associated with the beginning of frames 502a, 502b. When unicast signaling is used, as each UE has a respective local clock (e.g., local clock 418 in FIG. 4), potentially different timing information 507 with different compensations for the propagation delay 508 may be individually sent to different UEs, including the UE 506.

At 906, the base station receives an uplink transmission from the UE after the downlink transmission. For example, 906 may be performed by reception component 1004 of FIG. 10. For example, referring to FIGS. 4 and 5, after the UE 406, 506 receives the downlink transmission (e.g., frame 502b) including the timing information 402, 507 from the base station 404, 504 after a propagation delay 508 from transmitted frame 502a, the base station 404, 504 receives an uplink transmission from the UE 406, 506. Referring to FIG. 8, after the UE 804 receives the downlink transmission 806 at time t1, the UE 804 transmits an uplink transmission 808 at time t2. The uplink transmission 808 may be, for example, a SRS waveform (e.g., when the UE 804 is in connected mode) or a RACH waveform (e.g., when the UE 804 is in an idle mode). The base station 802 subsequently receives the uplink transmission 808 at time t3.

At 908, the base station determines a RTT compensation associated with the timing information based on a RTT between the downlink transmission and the uplink transmission. For example, 908 may be performed by the RTT compensation determination component 1010 of FIG. 10. For example, referring to FIGS. 4 and 5, based on a RTT between the downlink and uplink transmissions, the base station 404, 504 may send a RTT compensation for the UE 406, 506 associated with the timing information 402, 507 determined from one or more of a TA within a TA command, a timing offset between a base station transmission and reception timelines, an estimated time difference between a base station transmission timing and a base station reception timing, and an actual time difference between base station transmission and reception timings and UE transmission and reception timings. For example, the base station 404, 504 may transmit a TA 512 within a TA command as the RTT compensation, and the UE may receive the TA 512 within a TA command as the RTT compensation.

In one aspect of 908, the RTT compensation includes a TA associated with adjustment of the timing information transmitted to the UE. In one aspect, the TA is transmitted in a TA command, and the TA command is associated with a first TA granularity. For example, referring to FIGS. 5, 6, the base station 504, 602 may determine the RTT compensation to be a TA 512, 603 within a TA command. The base station 504, 602 may determine a TA index value (e.g., a value of the 6-bit or 12-bit TA command illustrated in MAC-CE 700 of FIG. 7A or RAR 750 of FIG. 7B) for the UE 506, 604 to identify the TA. The TA command may be associated with a TA granularity, which indicates a time ($T_s$) by which the TA index value is multiplied in order to obtain the TA (e.g., TA 603 in FIG. 6). Examples of associated TA granularities are shown in Table 1 above.

At 910, the base station indicates a second TA granularity to the UE that is different from the first TA granularity based on an identity of the UE, where the identity of the UE indicates one of an IIOT UE or a legacy UE. Potentially, the second TA may be referred to as a "timing advance refinement" and/or a "high precision timing advance." In some aspects, the second TA may be transmitted to the UE without transmitting the first TA. For example, the second TA may be used to indicate a finer granularity and/or higher precision than the first TA and so, in some cases, the first TA may be omitted. For example, 910 may be performed by the granularity indication component 1012 of FIG. 10. The second TA granularity may be finer than the first TA granularity. For example, referring to FIGS. 6 and 7A-7B, the base station 602 may configure a UE-specific TA granularity (e.g., a second TA granularity) different than the aforementioned TA granularities (e.g., a first TA granularity) shown, for instance, in Table 1. Thus, different TA granularities may be configured for different UEs based on a UE-reported identity of the UE (e.g., IIOT UEs or legacy UEs). For example, an IIOT UE may be configured with a finer (e.g., smaller) TA granularity associated with a SCS different than that of a legacy UE. The base station may indicate the UE-specific TA granularities in downlink transmission, for example, by configuring MAC-CE 700 to have a new header or a larger size TA command which is transmitted to IIOT UEs separately from other TA commands, or by transmitting MAC-CEs with different header values to convey to UEs higher resolutions of TAs via different TA granularities without increasing the size of the TA command.

In one aspect of 910, the second TA granularity may be preconfigured or indicated in a message separate from the TA command. For example, referring to FIGS. 7A and 7B, different TA granularities may be provided without changing the maximum size or header of the TA command 702, 752 in MAC-CE 700 or RAR 750. For example, IIOT UEs may be configured with a different TA granularity than legacy UEs (e.g., 64 $T_s$ or other granularity smaller than those in Table 1) depending on the SCS for communication between the base station and UE. In another example, legacy UEs may request the base station or network to configure the UEs with a UE-specific TA granularity which may be different than other UEs. In some other aspects, a new MAC-CE with different size or header values than MAC-CE 700 may be provided to UEs receiving TAs based on the second set of TA granularities.

In another aspect of 910, the second TA granularity is indicated within the TA command. In various examples, one or more bits in the TA Command 702 of MAC-CE 700 may be used to designate the TA as being based on a first set of TA granularities (e.g., as shown for example in Table 1) or based on a second set of finer TA granularities. In another example, one of the values of the TAG ID 704 of MAC-CE 700 may be used to designate the first or second set of TA granularities.

In certain aspects, a base station transmission timing for the downlink transmission and a base station reception timing for the uplink transmission are aligned within a guard period. In other aspects, the uplink transmission of the UE is received within a cyclic prefix of a subsequent downlink transmission. For example, referring to FIG. 6, the base station transmission timeline 606 and the base station reception timeline 608 are aligned within a guard period when base station 602 and UE 604 communicate in a TDD mode.

In other aspects, the uplink transmissions from multiple UEs 604 may be received by the base station 602 within the CP of a subsequent downlink transmission in either the TDD mode or a FDD mode.

In another aspect of 908, the RTT compensation may indicated as a TA based on a timing offset between a base station transmission timing and a base station reception timing. The timing offset is transmitted to the UE in a separate message from the timing information. For example, referring to FIG. 6, the base station may determine the RTT compensation to be a timing offset 614 between base station transmission and reception timelines 606, 608. In various aspects, the base station may indicate the timing offset 614 to the UE via a separate message from the timing information, rather than applying the timing offset 614 to the broadcasted timing information advertised by the base station.

In a further aspect of 908, the RTT compensation may be an estimated time difference between a base station transmission timing for the downlink transmission and a base station reception timing for the uplink transmission. The estimated time difference may be transmitted to the UE in a separate message from a TA command. For example, referring to FIG. 8, the base station may determine the RTT compensation to be an estimated time difference (A) between a base station transmission timing (t0) for a downlink transmission 806 and a base station reception timing (t3) for an uplink transmission 808. The base station may estimate the value A by calculating the difference between t3 and to, and may send the value A in the downlink transmission 806. The message including the value A may be, for example, a layer 2 MAC message or a layer 3 RRC message transmitted by the base station to the UE separate from a TA command.

In certain aspects where the RTT compensation is separate from the TA command, the TA command may associated with a first TA granularity, and the RTT compensation may indicate a second TA granularity different than the first TA granularity. For example, referring to FIG. 8, the base station 802 or network may indicate, in a separate message from the TA command, the value A as the RTT compensation for UE 804 to use for timing synchronization. In contrast to TA command 702 or 752 (see FIG. 7), which may be limited in size to a small number of bits and associated with a TA granularity such as those in Table 1 above, the message including the value A may not be so limited and be associated with finer TA granularities, therefore ranging in the tens of nanoseconds, for example. Thus, the value A has higher granularity or precision for timing adjustment than the TA command, which may be constrained in size to the larger, microsecond range as described above.

In an additional aspect of 908, the determined RTT compensation may be an actual time difference between the base station time difference and the UE time difference. To make this determination, at 912, the base station receives a UE time difference between a UE reception timing for the downlink transmission and a UE transmission timing for the uplink transmission, and at 914, the base station determines a base station time difference between a base station transmission timing for the downlink transmission and a base station reception timing for the uplink transmission. For example, 912 may be performed by the reception component 1004, and 914 may be performed by the base station time difference determination component 1014. For example, referring to FIG. 8, after the UE receives at time t1 the downlink transmission 806 sent at time to, the UE 804 may transmit at time t2 to the base station 802 the value B (the UE time difference between t2 and t1) in uplink transmission 808. Once the base station receives the value B at time t3, the base station may obtain the RTT and thus the propagation delay by calculating the actual value A (the base station time difference between t3 and t0) and subtracting the UE-indicated value B (t2−t1). The base station may thus determine the RTT compensation to be an actual time difference (A−B) between the base station transmission timing (t0) and base station reception timing (t3), and the UE transmission timing (t2) and the UE reception timing (t1).

At 916, the base station adjusts the timing information based on the RTT compensation. For example, 916 may be performed by the base station timing adjustment component 1016 of FIG. 10. For example, referring to FIG. 8, if the downlink transmission 806 was unicast to UE 804, the base station 802 may adjust the timing information with the RTT compensation and send the adjusted timing information to the UE.

At 918, the base station transmits the RTT compensation to the UE. For example, 918 may be performed by the transmission component 1008 of FIG. 10. The RTT compensation allows RTT to occur within at most 1 microsecond of the downlink transmission. For example, referring to FIGS. 4-8, the base station 404 may send a RTT compensation to the UE 406. The timing information 402, 507 may be transmitted with the RTT compensation. In one aspect, the RTT compensation may be a TA 512 within a TA command. The RTT compensation may be sent, for example, at time t1 in the base station transmission timeline 606. In another aspect, referring to FIG. 6, the RTT compensation may be the timing offset 614, and the base station may indicate the timing offset 614 to the UE via a separate message from the timing information. The separate message may be a PLY message, a MAC message, or a RRC message. In a further aspect, referring to FIG. 8, the RTT compensation may be the estimated value A, and the base station 802 or network may indicate, in a separate message from the TA command, the value A as the RTT compensation for UE 804 to use for timing synchronization. The separate message may be a PLY message, a MAC message, or a RRC message. In an additional aspect, referring to FIG. 8, the RTT compensation may be the value (A−B), and the base station 802 or network may provide the RTT compensation (e.g., the difference between the values of A and B) to the UE 804 based on whether the downlink transmission 806 including the timing information (e.g., the grandmaster clock time) was broadcast or unicast to the UE 804. In this way, base stations may deliver timing information to UEs in outdoor scenarios while taking into account RTT compensation to meet the ≤1 μs synchronization accuracy parameter of IEEE1588v2/Precision Time Protocol.

In certain aspects of 918, when the downlink transmission is broadcast, the RTT compensation is transmitted to a plurality of UEs. In other aspects, when the downlink transmission is unicast, the timing information is adjusted based on the RTT compensation, and the adjusted timing information is transmitted to the UE. For example, referring to FIG. 8, the base station 802 or network may provide the RTT compensation (e.g., the difference between the values of A and B) to the UE 804 based on whether the downlink transmission 806 including the timing information (e.g., the grandmaster clock time) was broadcast or unicast to the UE 804. In one aspect, if the downlink transmission 806 was broadcast to UE 804, the base station 802 may provide the RTT compensation to the UE for the UE to adjust its local clock to synchronize the timing information. For example, the RTT compensation may be broadcast to a plurality of UEs. In another aspect, if the downlink transmission 806 was unicast to UE 804, the base station 802 may either provide the RTT compensation to the UE as discussed above, or adjust the timing information with the RTT compensation and send the adjusted timing information to the UE.

Figure 10:
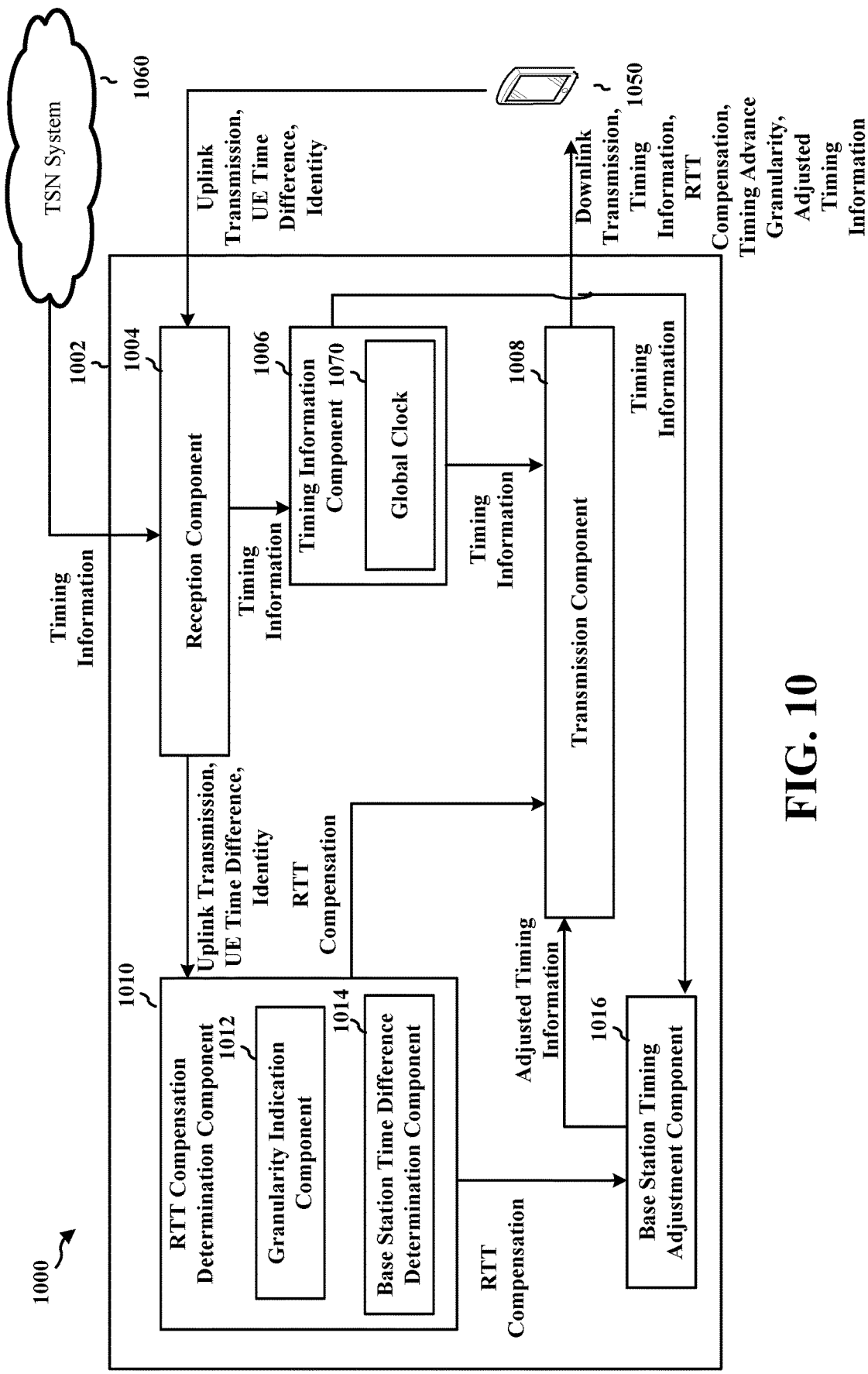
FIG. 10 is a conceptual data flow diagram illustrating the data flow between different means/components in an example base station apparatus.

FIG. 10 is a conceptual data flow diagram 1000 illustrating the data flow between different means/components in an example apparatus 1002. The apparatus may be a base station (e.g., the base station 102, 310, 404, 504, 602, 802) in communication with a UE 1050 (e.g., the UE 104, 350, 406, 506, 604, 804) and a TSN (e.g., TSN system 412).

The apparatus 1002 includes a reception component 1004 that receives timing information from a TSN, e.g., as described in connection with 902 from FIG. 9. The reception component 1004 also receives an uplink transmission from the UE 1050 after the downlink transmission, e.g., as described in connection with 906 from FIG. 9. The reception component 1004 also receives a UE time difference between a UE reception timing for the downlink transmission and a UE transmission timing for the uplink transmission, e.g., as described in connection with 912 from FIG. 9. The reception component 1004 further receives an identity reported by the UE, e.g., as described in connection with 910 from FIG. 9.

The apparatus 1002 includes a timing information component 1006 that receives the timing information from a TSN system 1060 (e.g., TSN 412) via the reception component 1004, e.g., as described in connection with 902 from FIG. 9. The global clock 1070 of the base station may be updated with the timing information. The timing information component 1006 also sends a downlink transmission including the timing information to UE 1050 via a transmission component 1008, e.g., as described in connection with 904 from FIG. 9. While FIG. 10 illustrates the global clock 1070 as part of the timing information component 1006, they may be separate components.

The apparatus 1002 includes a RTT compensation determination component 1010 that determines a RTT compensation associated with the timing information based on a RTT between the downlink transmission and the uplink transmission, e.g., as described in connection with 908 from FIG. 9. The RTT compensation determination component 1010 includes a granularity indication component 1012, which indicates a second TA granularity to the UE different from the first TA granularity based on the identity of the UE received via the reception component 1004, e.g., as described in connection with 910 from FIG. 9. The RTT compensation determination component 1010 further includes a base station time difference determination component 1014, which determines a base station time difference between a base station transmission timing for the downlink transmission and a base station reception timing for the uplink transmission, e.g., as described in connection with 914 from FIG. 9. The RTT compensation determination component 1010 further transmits the RTT compensation to the UE via the transmission component 1008, e.g., as described in connection with 918 of FIG. 9.

The apparatus 1002 additionally includes a base station timing adjustment component 1016 that adjusts the timing information based on the RTT compensation received from the RTT compensation determination component 1010 and the timing information received from the timing information component 1006, e.g., as described in connection with 916 from FIG. 9. The base station timing adjustment component 1016 sends the adjusted timing information to the UE 1050, via the transmission component 1008.

The transmission component 1008 of the apparatus 1002 sends to UE 1050 downlink transmissions including timing information received from the timing information component 1006, RTT compensation received from the RTT compensation determination component 1010, and adjusted timing information received from the base station timing adjustment component 1016.

The apparatus 1002 may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
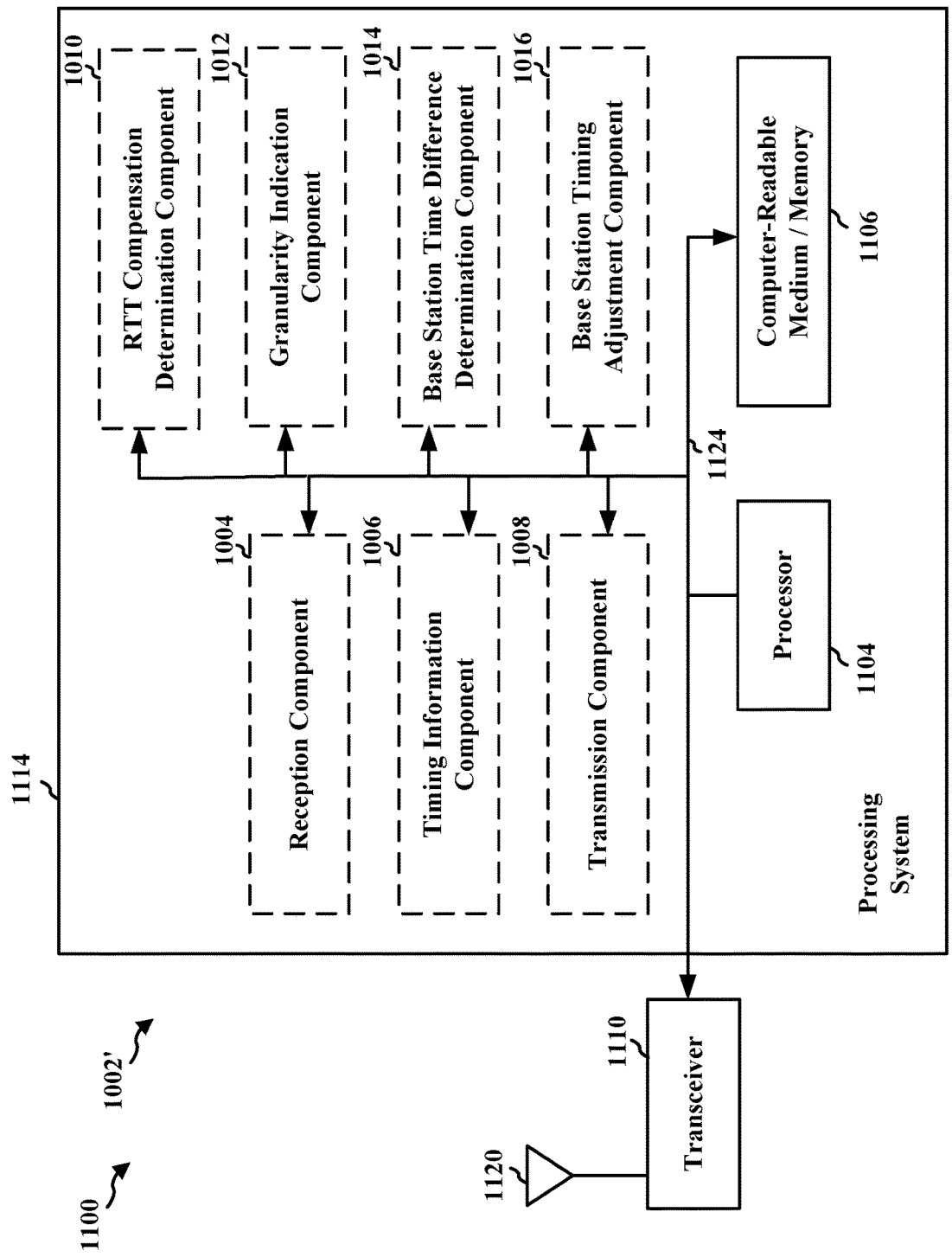
FIG. 11 is a diagram illustrating an example of a hardware implementation for a base station apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. In some other aspects, the processing system 1114 may be the entire base station (e.g., see 310 of FIG. 3).

In one configuration, the apparatus 1002/1002' for wireless communication includes means for sending a downlink transmission including timing information to a UE; means for receiving an uplink transmission from the UE after the downlink transmission; means for determining a RTT compensation associated with the timing information based on a RTT between the downlink transmission and the uplink transmission; and means for transmitting the RTT compensation to the UE. The apparatus 1002/1002' may further include means for receiving the timing information from a TSN; means for adjusting the timing information based on the RTT compensation; and means for indicating a second TA granularity to the UE different from the first TA granularity based on an identity of the UE, wherein the identity of the UE indicates one of an IIOT UE or a legacy UE. The apparatus 1002/1002' may additionally include means for receiving a UE time difference between a UE reception timing for the downlink transmission and a UE transmission timing for the uplink transmission; and means for determining a base station time difference between a base station transmission timing for the downlink transmission and a base station reception timing for the uplink transmission.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
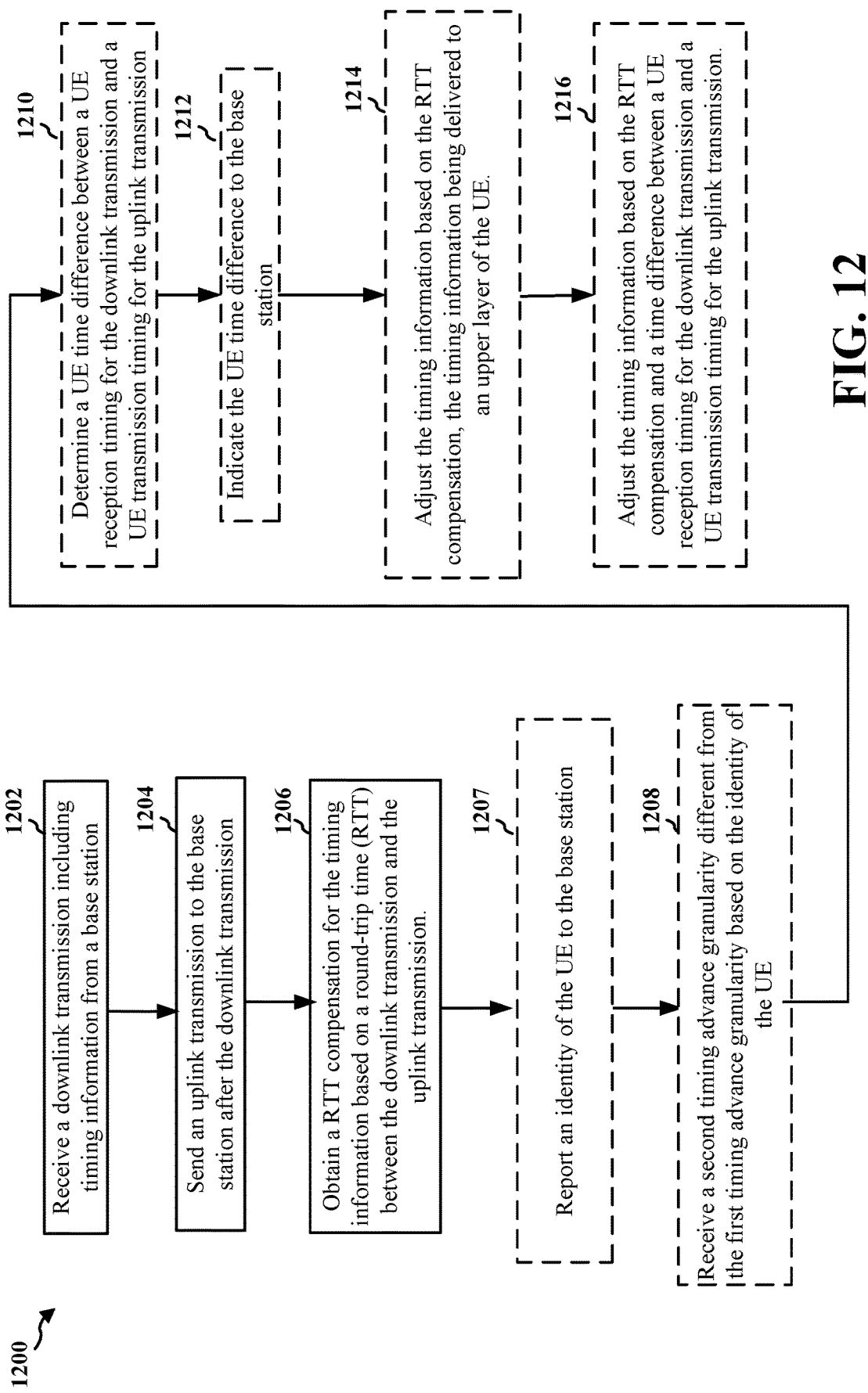
FIG. 12 is a flowchart of a method of wireless communication at a UE.

FIG. 12 is a flowchart 1200 of a method of wireless communication. The method may be performed by a UE (e.g., the UE 104, 350, 406, 506, 604, 804; the apparatus 1302/1302'; the processing system 1414, which may include the memory 360 and which may be the entire UE 104, 350, 406, 506, 604, 804 or a component of the UE 104, 350, 406, 506, 604, 804, such as the TX processor 368, the RX processor 356, and/or the controller/processor 359). Optional aspects are illustrated in dashed lines. The method allows a UE to obtain RTT compensation from a base station to use in adjusting their individual or local time clocks, thereby allowing UEs to synchronize at a high precision with the time clock of the base station. The present disclosure further allows UEs to be configured with different resolutions or granularities in timing correction so that certain UEs can achieve high precision timing correction while other UEs can adjust their time clocks with less precision.

At 1202, the UE receives a downlink transmission including timing information from a base station. For example, 1202 may be performed by the reception component 1304 of FIG. 13. The timing information may indicate information associated with a beginning of a frame of the downlink transmission. For example, referring to FIGS. 4 and 5, the UE 406, 506 receives a downlink transmission (e.g., frame 502b) including the timing information 402, 507 from the base station after a propagation delay 508 from transmitted frame 502a. The timing information 402, 507 may be associated with one or more symbols and/or slots at the beginning of a downlink transmission (e.g., frame 502a and/or frame 502b). Moreover, referring to FIG. 8, the UE 804 may receive a downlink transmission 806 at time t1, corresponding to the start of a frame boundary from the perspective of the UE. The downlink transmission 806 may include timing information corresponding to the absolute time provided by the grandmaster clock (e.g., timing information 507 in FIG. 5).

In one aspect of 1202, the downlink transmission including the timing information is received via broadcast. In another aspect of 1202, the downlink transmission including the timing information is received via unicast. For example, referring to FIG. 5, timing information 507 received from the TSN (e.g., TSN 412) may be commonly broadcast to multiple UEs 506, and the timing information 507 may refer to one or more symbols and/or one or more slots 510 at the beginning of frames 502a, 502b. In some other aspects, timing information 507 may be unicast to individual UEs 506 that should receive the timing information (for example, for individual applications), and/or may refer to the beginning of frames 502a, 502b. When unicast signaling is used, as each UE has their own local clock (e.g., local clock 418 in FIG. 4), potentially different timing information 507 with different compensations for propagation delay 508 may be individually received by different UEs 506.

At 1204, the UE sends an uplink transmission to the base station after the downlink transmission. For example, 1204 may be performed by transmission component 1314 of FIG. 13. For example, referring to FIGS. 4 and 5, after the UE 406, 506 receives the downlink transmission (e.g., frame 502b) including the timing information 402, 507 from the base station, the UE may subsequently send an uplink transmission.

In certain aspects, a base station transmission timing for the downlink transmission and a base station reception timing for the uplink transmission are aligned within a guard period. In other aspects, the uplink transmission is transmitted to the base station within a cyclic prefix of a subsequent downlink transmission. For example, referring to FIG. 6, the base station transmission timeline 606 and the base station reception timeline 608 are aligned within a guard period when base station 602 and UE 604 communicate in a TDD mode. In other aspects, the uplink transmissions from multiple UEs 604 may be received by the base station 602 within the CP of a subsequent downlink transmission in either the TDD mode or a FDD mode.

At 1206, the UE obtains a RTT compensation for the timing information based on a RTT between the downlink transmission and the uplink transmission. For example, 1206 may be performed by the RTT compensation component 1306. The RTT compensation allows RTT to occur within at most 1 microsecond of the downlink transmission. For example, referring to FIGS. 4 and 5, based on a RTT between the downlink and uplink transmissions, the UE 406 may obtain from base station 404 a RTT compensation for the UE 406 associated with the timing information 402, 507. The RTT compensation may be one or more of a TA within a TA command, a timing offset between a base station transmission and reception timelines, an estimated time difference between a base station transmission timing and a base station reception timing, and an actual time difference between base station transmission and reception timings and UE transmission and reception timings. For example, the base station may transmit as the RTT compensation, and the UE may receive as the RTT compensation, a TA 512 within a TA command. In this way, base stations may deliver timing information to UEs in outdoor scenarios while taking into account RTT compensation to meet the ≤1 µs synchronization accuracy parameter of IEEE1588v2/Precision Time Protocol.

In one aspect of 1206, the RTT compensation may be a TA for adjusting the timing information received by the UE. In one aspect, the TA is received in a TA command, and the TA command is associated with a first TA granularity. For example, referring to FIGS. 5, 6, 7A and 7B, the UE may receive the RTT compensation (e.g., a TA 512) within a TA command. The TA is based on a TA index value (e.g., a value of the 6-bit or 12-bit TA command illustrated in FIG. 7A or 7B) and a TA granularity, which indicates a time ($T_s$) by which the TA index value is multiplied in order to obtain the TA. Examples of associated TA granularities are shown in Table 1 above. For example, when the UE 604 receives the downlink transmission including the timing information and a TA 603 at time t2, assuming a TA granularity associated with a 15 kHz SCS and a TA index value of 2, the UE 604 may advance its UE transmission timeline 610 by approximately 1 µs or 1000 ns with respect to the global clock of the base station 602.

At 1207, the UE reports an identity of the UE to the base station, where the identity of the UE indicates one of an IIOT UE or a legacy UE. For example, 1207 may be performed by the identity report component 1318 of FIG. 13. For example, referring to FIGS. 6 and 7A-7B, the UE (e.g., UE 604) may report its identity as either an IIOT UE or a legacy UE to the base station (e.g., base station 602) or another network node (for example, during a SRS, RACH, or other uplink transmission). Depending on the reported identity of the UE, the base station may configure or indicate UE-specific TA granularities. For example, if the UE transmits a message to the base station including an identification as a legacy UE, the base station may configure the UE with a TA granularity in accordance with Table 1. In another example, if the UE transmits a message to the base station including an identification as an IIOT UE, the base station may indicate to the UE a UE-specific TA granularity which is finer than those indicated above in Table 1. In other examples, the base station may indicate identical or larger TA granularities to IIOT UEs compared to legacy UEs.

At 1208, the UE receives a second TA granularity different from the first TA granularity based on an identity of the UE, where the identity of the UE indicates one of an IIOT UE or a legacy UE. Potentially, the second TA may be referred to as a "timing advance refinement" and/or a "high precision timing advance." In some aspects, the second TA may be received without receiving the first TA. For example, the second TA may be used to indicate a finer granularity and/or higher precision than the first TA and so, in some cases, the first TA may be omitted. For example, 1208 may be performed by the granularity reception component 1308 of FIG. 13. The second TA granularity is finer than the first TA granularity. For example, referring to FIGS. 6 and 7A-7B, the UE 604 may be configured with a UE-specific TA granularity (e.g., a second TA granularity) different than the aforementioned TA granularities (e.g., a first TA granularity) shown, for instance, in Table 1. Thus, different TA granularities may be configured for different UEs based on the identity reported by the UE at 1207 (e.g., IIOT UEs or legacy UEs). For example, an IIOT UE may be configured with a finer (e.g., smaller) TA granularity associated with a SCS than that of a legacy UE. The UE may receive a UE-specific TA granularity in downlink transmission, through for example, a MAC-CE 700 reconfigured to have a new header or a larger size TA command which is received by IIOT UEs separately from other TA commands, or by receiving MAC-CEs with different header values conveying higher resolutions of TAs via different TA granularities without increasing the size of the TA command.

In one aspect of 1208, the second TA granularity is preconfigured or received in a separate message from the TA command. For example, referring to FIGS. 7A and 7B, different TA granularities may be configured or received without changing the maximum size or header of the TA command 702, 752 in MAC-CE 700 or RAR 750. For example, IIOT UEs may be configured with a different TA granularity than legacy UEs (e.g., 64 $T_s$ or other granularity smaller than those in Table 1) depending on the SCS for communication between the base station and UE. In another example, legacy UEs may request the base station or network to configure the UEs with a UE-specific TA granularity which may be different than other UEs. In some other aspects, a new MAC-CE with different size or header values than MAC-CE 700 may be received by UEs configured to receive TAs based on the second set of TA granularities.

In another aspect of 1208, the second TA granularity is received within the TA command. In various examples, one or more bits in the TA Command 702 of MAC-CE 700 may be used to designate the TA as being based on a first set of TA granularities (e.g., as shown for example in Table 1) or based on a second set of finer TA granularities. In another example, one of the values of the TAG ID 704 of MAC-CE 700 may be used to designate the first or second set of TA granularities.

In a further aspect of 1206, the RTT compensation may be a TA based on a timing offset between a base station transmission timing for the downlink transmission and a base station reception timing for the uplink transmission. The timing offset is received in a separate message from the timing information. For example, referring to FIG. 6, the TA 603 received and applied by the UE may be based on the timing offset 614 (e.g., gNBR×Offset) between the base station transmission timeline 606 and base station reception timeline 608. In various aspects, the UE may receive the timing offset 614 from the base station via a separate message from the timing information, rather than receiving the timing offset 614 already applied to the broadcasted timing information advertised by the base station. The separate message may be a PLY message, a MAC message, or a RRC message received from the base station.

In another aspect of 1206, the RTT compensation may be an estimated time difference between a base station transmission timing for the downlink transmission and a base station reception timing for the uplink transmission. The estimated time difference may be received in a separate message from a TA command. For example, referring to FIG. 8, the value A represents the base station time difference 810 between t3 (the base station reception timing for an uplink transmission 808) and t0 (the base station transmission timing for a downlink transmission 806). In one aspect, the base station 802 estimates the value A by calculating the difference between t3 and t0, and the UE 804 receives the value A from the base station in a message. The message including the value A may be, for example, a PLY message, a layer 2 MAC message or a layer 3 RRC message transmitted by the base station to the UE separate from a TA command.

In certain aspects where the RTT compensation is separate from the TA command, the TA command is associated with a first TA granularity, and the RTT compensation indicates a second TA granularity different than the first TA granularity. For example, referring to FIG. 8, the UE 804 may receive from the base station 802 or network, in a separate message from the TA command, the value A as the RTT compensation for UE 804 to use for timing synchronization. In contrast to TA command 702 or 752 (see FIG. 7), which may be limited in size to a small number of bits and associated with a TA granularity such as those in Table 1 above, the message including the value A may not be so limited and be associated with finer TA granularities, therefore ranging in the tens of nanoseconds, for example. Thus, the value A has higher granularity or precision for timing adjustment than the TA command, which may be constrained in size to the larger, microsecond range as described above.

In an additional aspect of 906, the RTT compensation may be an actual time difference between a base station time difference and a UE time difference, where the base station time difference is the difference between a base station transmission timing for an downlink transmission and a base station reception timing for an uplink transmission, and where the UE time difference is the difference between a UE transmission timing for the uplink transmission and a UE reception timing for the downlink transmission. To obtain the actual time difference, at 1210, the UE determines a UE time difference between a UE reception timing for the downlink transmission and a UE transmission timing for the uplink transmission, and at 1212, the UE indicates the UE time difference to the base station. For example, 1210 may be performed by the UE time difference determination component 1310 of FIG. 13, and 1212 may be performed by the indication component 1312 of FIG. 13. For example, referring to FIG. 8, after the UE 804 receives at time t1 the downlink transmission 806 sent at time t0, and prior to transmitting the uplink transmission 808 at time t2 to the base station 802, the UE determines the value B (the UE time difference between t2 and t1). The UE 804 may then indicate at time t2 the value B in uplink transmission 808 to the base station 802. Once the base station receives the value B at time t3, the base station may obtain the RTT and thus the propagation delay by calculating the actual value A (the base station time difference between t3 and t0) and subtracting the UE-indicated value B (t2−t1). The actual time difference (A−B) may thus be determined between the base station transmission timing (t0) and base station reception timing (t3), and the UE transmission timing (t2) and the UE reception timing (t1).

In certain aspects of 1206, when the downlink transmission is broadcast, the RTT compensation is received via broadcast. In other aspects, when the downlink transmission is unicast, adjusted timing information based on the RTT compensation is received from the base station. For example, referring to FIG. 8, the UE 804 may receive the RTT compensation (e.g., the difference between the values of A and B) from the base station 802 or network based on whether the downlink transmission 806 including the timing information (e.g., the grandmaster clock time) was broadcast or unicast to the UE 804. In one aspect, if the downlink transmission 806 was broadcast to UE 804, the UE 804 may receive the RTT compensation from the base station 802 for the UE to adjust its local clock to synchronize the timing information. In another aspect, if the downlink transmission 806 was unicast to UE 804, the UE may either receive the RTT compensation from the base station 802 as discussed above, or the UE may receive timing information already adjusted with the RTT compensation from the base station.

At 1214, the UE adjusts the timing information based on the RTT compensation, where the timing information is delivered to an upper layer of the UE. The timing information delivered to the upper layer is based on a UE reception timing for the downlink transmission and the RTT compensation. For example, 1214 may be performed by the UE timing adjustment component 1316 of FIG. 13. For example, referring to FIGS. 4, 5, and 6, after receiving the TA command with the RTT compensation (e.g., TA 512), the UE 406, 506 may adjust its local clock 418 with the TA 512 and deliver the adjusted time to the upper layers 514 of the UE 406, 506 (e.g., layer 2/layer 3). The time delivered may also be based on timing offset 614. For example, the UE may deliver an adjusted time to the upper layers 514 based on the following formula after receiving a broadcast timing information 402, 507:

Time Delivered to Upper Layer=Broadcasted Time+"Applied TA Advance"/2−gNBR×Offset, where: Broadcasted Time is the UE reception timing of the downlink transmission indicating the timing information 402, 507 after propagation delay 508; Applied TA Advance is the TA 512 indicated in the TA command; and gNBR×Offset is the timing offset 614 between the base station transmission timeline 606 and base station reception timeline 608.

At 1216, the UE adjusts the timing information based on the RTT compensation and a time difference between a UE reception timing for the downlink transmission and a UE transmission timing for the uplink transmission. For example, 1216 may be performed by the UE timing adjustment component 1316 of FIG. 13. For example, referring to FIG. 8, once the UE 804 obtains the timing information with the RTT compensation (e.g., the value A), the UE 804 may determine to adjust the timing information based on the propagation delay derived from the RTT compensation and the value B (the UE time difference 812 between UE transmission timing t2 and UE reception timing t1). For instance, the UE may calculate the RTT by subtracting the value B from the received value A from the base station. The UE may then divide the RTT by two to obtain the one-way propagation delay, which the UE may use to adjust the timing information received from the base station to synchronize its local clock with the global clock.

Figure 13:
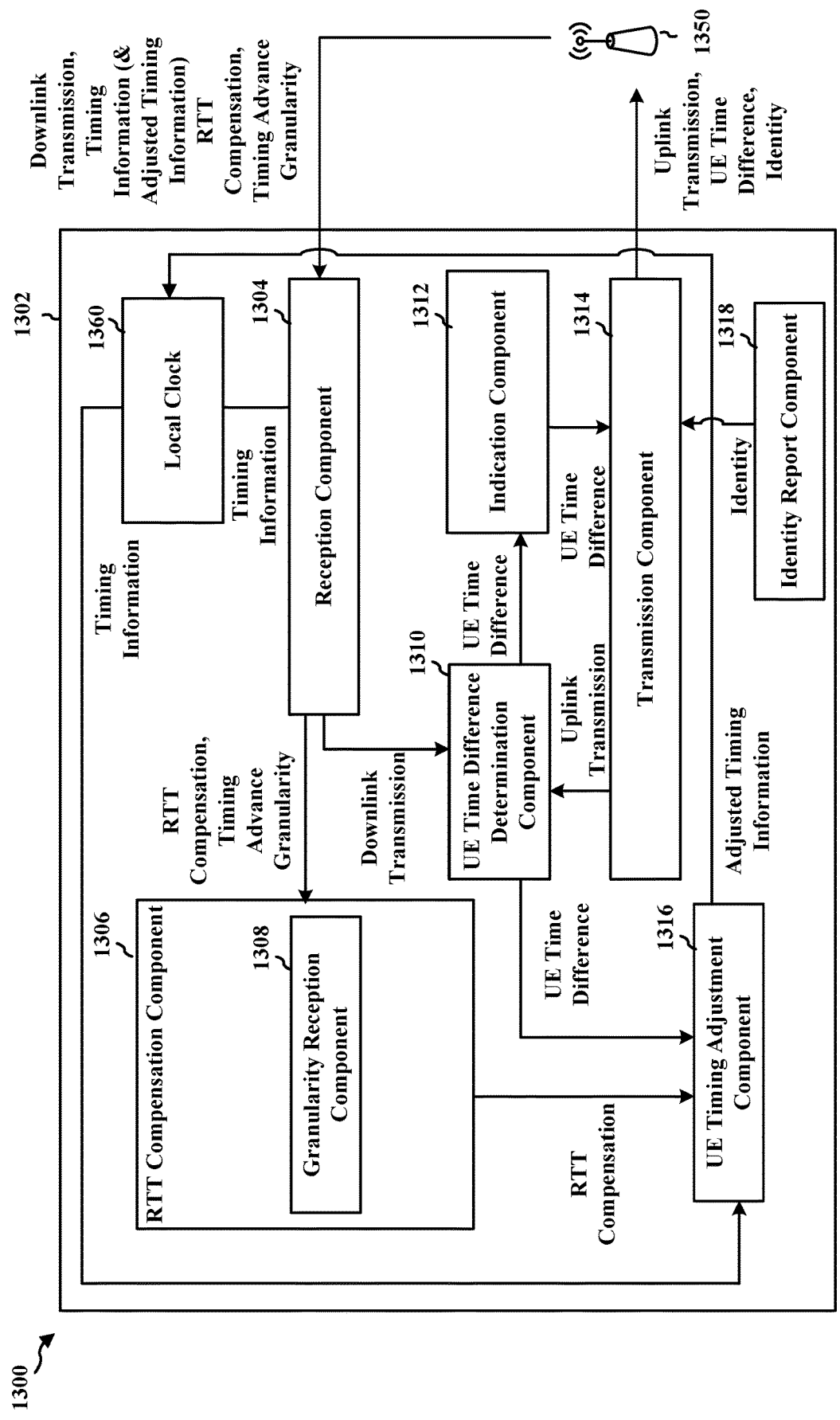
FIG. 13 is a conceptual data flow diagram illustrating the data flow between different means/components in an example UE apparatus.

FIG. 13 is a conceptual data flow diagram 1300 illustrating the data flow between different means/components in an example apparatus 1302. The apparatus may be a UE (e.g., UE 104, 350, 406, 506, 604, 804) in communication with a base station (e.g., the base station 102, 310, 404, 504, 602, 802).

The apparatus 1302 includes a reception component 1304 that receives a downlink transmission including timing information from a base station, e.g., as described in connection with 1202 from FIG. 12. The timing information updates a local clock 1360 of the apparatus 1302.

The apparatus 1302 includes a RTT compensation component 1306 that obtains a RTT compensation for the timing information based on a RTT between the downlink transmission and the uplink transmission, e.g., as described in connection with 1206 from FIG. 12. The RTT compensation component 1306 includes a granularity reception component 1308 which receives, via the reception component 1304, a second TA granularity different from the first TA granularity based on an identity of the UE, e.g., as described in connection with 1208 from FIG. 12.

The apparatus 1302 also includes a UE time difference determination component 1310 that determines a UE time difference between a UE reception timing for the downlink transmission and a UE transmission timing for the uplink transmission, e.g., as described in connection with 1210 from FIG. 12. The apparatus further includes an indication component 1312 that indicates the UE time difference to the base station via a transmission component 1314 of the apparatus 1302, e.g., as described in connection with 1212 from FIG. 12.

The apparatus 1302 additionally includes a UE timing adjustment component 1316 that adjusts the timing information based on the RTT compensation, the timing information being delivered to an upper layer of the UE, e.g., as described in connection with 1214 from FIG. 12. The UE timing adjustment component 1316 also adjusts the timing information based on the RTT compensation and a time difference between a UE reception timing for the downlink transmission and a UE transmission timing for the uplink transmission, e.g., as described in connection with 1216 from FIG. 12.

The transmission component 1314 sends an uplink transmission to the base station 1350 after the downlink transmission received via the reception component 1304. The transmission component 1314 also sends the UE time difference received from the indication component 1312. The transmission component 1314 further sends to base station 1350 an identity of the UE (e.g., an IIOT UE or a legacy UE) received from an identity report component 1318 of apparatus 1302.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
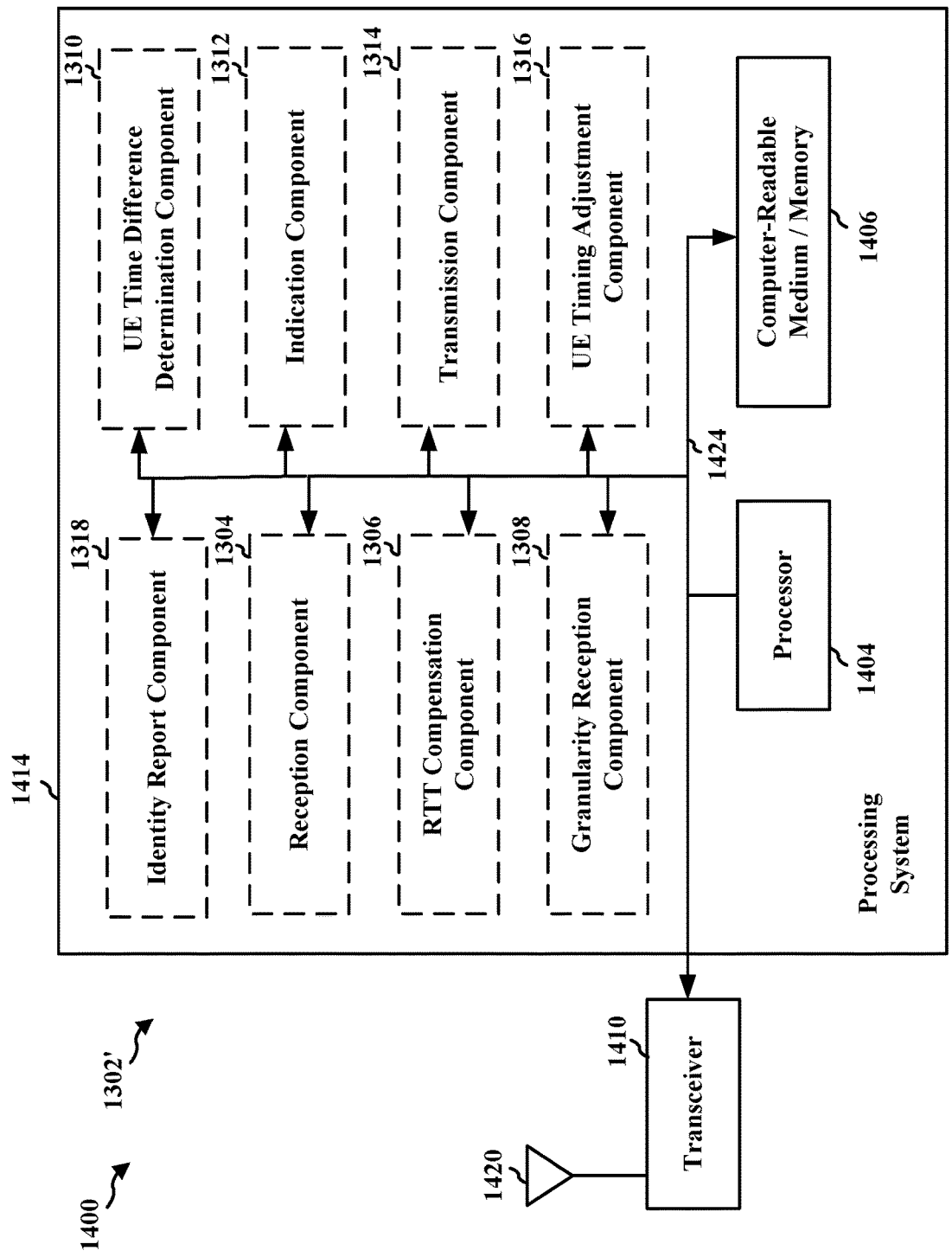
FIG. 14 is a diagram illustrating an example of a hardware implementation for a UE apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1314, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. In some other aspects, the processing system 1414 may be the entire UE (e.g., see 350 of FIG. 3).

In one configuration, the apparatus 1302/1302' for wireless communication includes means for receiving a downlink transmission including timing information from a base station; means for sending an uplink transmission to the base station after the downlink transmission; and means for obtaining a RTT compensation for the timing information based on a RTT between the downlink transmission and the uplink transmission. The apparatus 1302/1302' may also include means for adjusting the timing information based on the RTT compensation, where the timing information is delivered to an upper layer of the apparatus 1302/1302', and means for adjusting the timing information based on the RTT compensation and a time difference between a UE reception timing for the downlink transmission and a UE transmission timing for the uplink transmission. The apparatus 1302/1302' may further include means for receiving a second TA granularity different from the first timing advance granularity based on an identity of the apparatus 1302/1302', wherein the identity of the apparatus 1302/1302' indicates one of an IIOT UE or a legacy UE. The apparatus 1302/1302' may additionally include means for determining a UE time difference between a UE reception timing for the downlink transmission and a UE transmission timing for the uplink transmission; and means for indicating the UE time difference to the base station, wherein the RTT compensation indicates an actual time difference between a base station time difference and the UE time difference, the base station time difference being the difference between a base station transmission timing for the downlink transmission and a base station reception timing for the uplink transmission.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure thus allows a base station to indicate RTT compensation for UEs to use in adjusting their individual or local time clocks, thereby allowing UEs to synchronize at a high precision with the time clock of the base station. The present disclosure further allows UEs to be configured with different resolutions or granularities in timing correction so that certain UEs can achieve high precision timing correction while other UEs can adjust their time clocks with less precision. In this way, base stations may deliver timing information to UEs in outdoor scenarios while taking into account RTT compensation to meet the ≤1 μs synchronization accuracy parameter of IEEE1588v2/Precision Time Protocol. Moreover, certain UEs (e.g., IIOT UEs) may obtain higher precision for timing correction while other UEs (e.g., non-IIOT UEs and/or legacy UEs may observe other, less precise timing synchronization parameters).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
communicating, with a network node, at least one signal associated with a propagation delay between the UE and the network node; and
receiving, from the network node, information indicating a timing advance (TA) associated with the propagation delay for timing alignment with the network node, the TA having a precision that corresponds to a type of the UE, wherein the type of the UE comprises one of an Industrial Internet of Things (IIoT) UE or a non-IIoT UE, and the precision of the TA is greater for the IIoT UE than for the non-IIoT UE.

2. The method of claim 1, further comprising:
transmitting, to the network node, information indicating the type of the UE.

3. The method of claim 1, further comprising:
applying the TA to a clock associated with communication by the UE, wherein
the TA is applied to the clock to align the clock with another clock associated with communication by the network node.

4. The method of claim 3, further comprising:
receiving information indicating an external reference time; and
synchronizing the clock with the external reference time, wherein
the TA is applied to the clock after synchronization of the clock with the external reference time.

5. The method of claim 4, wherein the TA is UE-specific, and the external reference time is UE-nonspecific.

6. The method of claim 1, wherein the TA is associated with a subcarrier spacing (SCS) configured for communication between the UE and the network node.

7. The method of claim 1, wherein the communicating, with the network node, the at least one signal associated with the propagation delay between the UE and the network node comprises at least one of:
receiving, from the network node, a first signal of the at least one signal indicating a transmission time at the network node, wherein a reception time at the UE for the first signal is later than the transmission time at the network node for the first signal; or
transmitting, to the network node, a second signal of the at least one signal indicating a transmission time at the UE, wherein the transmission time at the UE for the second signal is earlier than a reception time at the network node for the second signal, and wherein
the propagation delay is estimated for the TA based on at least one of a difference between the reception time at the UE for the first signal and the transmission time at the network n ode for the first signal or a difference between the transmission time at the UE for the second signal and the reception time at the network node for the second signal.

8. A method of wireless communication at a network node, comprising:
communicating, with a user equipment (UE), at least one signal associated with a propagation delay between the UE and the network node; and
transmitting, to the UE, information indicating a timing advance (TA) associated with the propagation delay for timing alignment by the UE with the network node, the TA having a precision that corresponds to a type of the UE,
wherein the type of the UE comprises one of an Industrial Internet of Things (IIoT) UE or a non-IIoT UE, and the precision of the TA is greater for the IIoT UE than for the non-IIoT UE.

9. The method of claim 8, further comprising:
receiving, from the UE, information indicating the type of the UE.

10. The method of claim 8, further comprising:
calculating the TA based on the propagation delay to align a local clock associated with the UE with another clock associated with communication by the network node.

11. The method of claim 10, further comprising:
transmitting information indicating an external reference time, wherein
the information indicating the TA is transmitted after the information indicating the external reference time.

12. The method of claim 11, wherein the TA is UE-specific, and the external reference time is UE-nonspecific.

13. The method of claim 8, wherein the TA is associated with a subcarrier spacing (SCS) configured for communication between the UE and the network node.

14. The method of claim 8, wherein the communicating, with the UE, the at least one signal associated with the propagation delay between the UE and the network node comprises at least one of:
transmitting, to the UE, a first signal of the at least one signal indicating a transmission time at the network node, wherein the transmission time at the network node for the first signal is earlier than a reception time at the UE for the first signal; or
receiving, from the UE, a second signal of the at least one signal indicating a transmission time at the UE, wherein a reception time at the network node for the second signal is later than the transmission time at the UE for the second signal; and
the propagation delay is estimated for the TA based on at least one of a difference between the reception time at the UE for the first signal and the transmission time at the network node for the first signal or a difference between the transmission time at the UE for the second signal and the reception time at the network node for the second signal.

15. An apparatus for wireless communication at a user equipment (UE), comprising:
a memory; and
at least one processor coupled to the memory and configured to:
communicate, with a network node, at least one signal associated with a propagation delay between the UE and the network node; and
receive, from the network node, information indicating a timing advance (TA) associated with the propagation delay for timing alignment with the network node, the TA having a precision that corresponds to a type of the UE,
wherein the type of the UE comprises one of an Industrial Internet of Things (IIoT) UE or a non-IIoT UE, and the precision of the TA is greater for the IIoT UE than for the non-IIoT UE.

16. The apparatus of claim 15, wherein the at least one processor is further configured to:
transmit, to the network node, information indicating the type of the UE.

17. The apparatus of claim 15, wherein the at least one processor is further configured to:
apply the TA to a clock associated with communication by the UE, wherein
the TA is applied to the clock to align the clock with another clock associated with communication by the network node.

18. The apparatus of claim 17, wherein the at least one processor is further configured to:
receive information indicating an external reference time; and
synchronize the clock with the external reference time, wherein
the TA is applied to the clock after synchronization of the clock with the external reference time.

19. The apparatus of claim 18, wherein the TA is UE-specific, and the external reference time is UE-nonspecific.

20. The apparatus of claim 15, wherein the TA is associated with a subcarrier spacing (SCS) configured for communication between the UE and the network node.

21. The apparatus of claim 15, wherein communication, with the network node, of the at least one signal associated with the propagation delay between the UE and the network node comprises at least one of to:
  receive, from the network node, a first signal of the at least one signal indicating a transmission time at the network node, wherein a reception time at the UE for the first signal is later than the transmission time at the network node for the first signal; or
  transmit, to the network node, a second signal of the at least one signal indicating a transmission time at the UE, wherein the transmission time at the UE for the second signal is earlier than a reception time at the network node for the second signal, and wherein
  the propagation delay is estimated for the TA based on at least one of a difference between the reception time at the UE for the first signal and the transmission time at the network node for the first signal or a difference between the transmission time at the UE for the second signal and the reception time at the network node for the second signal.

22. An apparatus for wireless communication at a network node, comprising:
  a memory; and
  at least one processor coupled to the memory and configured to:
    communicate, with a user equipment (UE), at least one signal associated with a propagation delay between the UE and the network node; and
    transmit, to the UE, information indicating a timing advance (TA) associated with the propagation delay for timing alignment by the UE with the network node, the TA having a precision that corresponds to a type of the UE,
    wherein the type of the UE comprises one of an Industrial Internet of Things (IIoT) UE or a non-IIoT UE, and the precision of the TA is greater for the IIoT UE than for the non-IIoT UE.

23. The apparatus of claim 22, wherein the at least one processor is further configured to:
  receive, from the UE, information indicating the type of the UE.

24. The apparatus of claim 22, wherein the at least one processor is further configured to:
  calculate the TA based on the propagation delay to align a local clock associated with the UE with another clock associated with communication by the network node.

25. The apparatus of claim 24, wherein the at least one processor is further configured to:
  transmit information indicating an external reference time, wherein
  the information indicating the TA is transmitted after the information indicating the external reference time.

26. The apparatus of claim 25, wherein the TA is UE-specific, and the external reference time is UE-nonspecific.

27. The apparatus of claim 22, wherein the TA is associated with a subcarrier spacing (SCS) configured for communication between the UE and the network node.

28. The apparatus of claim 22, wherein communication, with the UE, of the at least one signal associated with the propagation delay between the UE and the network node comprises at least one of to:
  transmit, to the UE, a first signal of the at least one signal indicating a transmission time at the network node, wherein the transmission time at the network node for the first signal is earlier than a reception time at the UE for the first signal; or
  receive, from the UE, a second signal of the at least one signal indicating a transmission time at the UE, wherein a reception time at the network node for the second signal is later than the transmission time at the UE for the second signal; and
  the propagation delay is estimated for the TA based on at least one of a difference between the reception time at the UE for the first signal and the transmission time at the network node for the first signal or a difference between the transmission time at the UE for the second signal and the reception time at the network node for the second signal.

29. A non-transitory, computer-readable medium storing computer-executable code for wireless communication at a user equipment (UE), the code when executed by a processor cause the processor to:
  communicate, with a network node, at least one signal associated with a propagation delay between the UE and the network node; and
  receive, from the network node, information indicating a timing advance (TA) associated with the propagation delay for timing alignment with the network node, the TA having a precision that corresponds to a type of the UE,
  wherein the type of the UE comprises one of an Industrial Internet of Things (IIoT) UE or a non-IIoT UE, and the precision of the TA is greater for the IIoT UE than for the non-IIoT UE.

30. A non-transitory, computer-readable medium storing computer-executable code for wireless communication at a network node, the code when executed by a processor cause the processor to:
  communicate, with a user equipment (UE), at least one signal associated with a propagation delay between the UE and the network node; and
  transmit, to the UE, information indicating a timing advance (TA) associated with the propagation delay for timing alignment by the UE with the network node, the TA having a precision that corresponds to a type of the UE,
  wherein the type of the UE comprises one of an Industrial Internet of Things (IIoT) UE or a non-IIoT UE, and the precision of the TA is greater for the IIoT UE than for the non-IIoT UE.

31. An apparatus for wireless communication at a user equipment (UE), comprising:
  a memory; and
  at least one processor coupled to the memory and configured to:
    receive timing information, via unicast, from a base station, the received timing information from the base station being from a time-sensitive network (TSN) system;
    send an uplink transmission to the base station after a downlink transmission from the base station; and
    obtain a round-trip time (RTT) compensation associated with adjusting the timing information based on a RTT measured using the downlink transmission and the uplink transmission.

32. The apparatus of claim 31, wherein the timing information received via unicast comprises a radio resource control (RRC) message.

33. An apparatus for wireless communication at a network node, comprising:
a memory; and
at least one processor coupled to the memory and configured to:
transmit timing information, via unicast, to a user equipment (UE), the transmitted timing information to the UE being from a time-sensitive network (TSN) system;
receive an uplink transmission from the UE after a downlink transmission from the network node; and
transmit a round-trip time (RTT) compensation associated with adjusting the timing information based on a RTT measured using the downlink transmission and the uplink transmission.

34. The apparatus of claim 33, wherein the timing information transmitted via unicast comprises a radio resource control (RRC) message.

* * * * *